(12) United States Patent
Choudhury et al.

(10) Patent No.: US 10,354,394 B2
(45) Date of Patent: Jul. 16, 2019

(54) DYNAMIC ADJUSTMENT OF FRAME RATE CONVERSION SETTINGS

(71) Applicant: Dolby Laboratories Licensing Corporation, San Francisco, CA (US)

(72) Inventors: Anustup Kumar Atanu Choudhury, Palo Alto, CA (US); Tao Chen, Palo Alto, CA (US); Robin Atkins, San Jose, CA (US); Samir N. Hulyalkar, Los Gatos, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/703,764

(22) Filed: Sep. 13, 2017

(65) Prior Publication Data
US 2018/0082429 A1  Mar. 22, 2018

Related U.S. Application Data

(60) Provisional application No. 62/395,617, filed on Sep. 16, 2016.

(51) Int. Cl.
*H04N 19/102* (2014.01)
*H04N 19/11* (2014.01)
(Continued)

(52) U.S. Cl.
CPC .............. *G06T 7/207* (2017.01); *G06T 7/248* (2017.01); *H04N 7/01* (2013.01);
(Continued)

(58) Field of Classification Search
CPC .... H04N 19/102; H04N 19/11; H04N 19/114; H04N 19/137; H04N 19/139; H04N 19/157
(Continued)

(56) References Cited

U.S. PATENT DOCUMENTS

| | | |
|---|---|---|
| 5,557,684 A | 9/1996 | Wang |
| 6,449,312 B1 | 9/2002 | Zhang |

(Continued)

FOREIGN PATENT DOCUMENTS

| | | |
|---|---|---|
| WO | 2011/094164 | 8/2011 |
| WO | 2014/193631 | 12/2014 |
| WO | 2015/130616 | 9/2015 |

OTHER PUBLICATIONS

Lee, Sung-Hee et al "Adaptive Motion Compensated Interpolation for Frame Rate-up Conversion" IEEE Transactions on Consumer Electronics, vol. 48, No. 3, Aug. 1, 2002, pp. 444-450.
(Continued)

*Primary Examiner* — Dominic D Saltarelli

(57) ABSTRACT

Motion characteristics related to the images are determined. A motion characteristics metadata portion is generated based on the motion characteristics, and is to be used for determining an optimal FRC operational mode with a downstream device for the images. The images are encoded into a video stream. The motion characteristics metadata portion is encoded into the video stream as a part of image metadata. The video stream is transmitted to the downstream device. The downstream device receives the video stream and operates the optimal FRC operational mode to generate, based on the images, additional images. The images and the additional images are rendered on a display device at an image refresh rate different from an input image refresh rate represented by images encoded in the video stream.

15 Claims, 10 Drawing Sheets

(51) Int. Cl.
  *H04N 19/114* (2014.01)
  *H04N 19/137* (2014.01)
  *H04N 19/139* (2014.01)
  *H04N 19/157* (2014.01)
  *G06T 7/207* (2017.01)
  *H04N 21/235* (2011.01)
  *H04N 21/2343* (2011.01)
  *G06T 7/246* (2017.01)
  *H04N 7/01* (2006.01)
  *H04N 21/24* (2011.01)

(52) U.S. Cl.
  CPC ..... *H04N 21/2343* (2013.01); *H04N 21/2353* (2013.01); *H04N 21/234381* (2013.01); *H04N 21/2401* (2013.01); *G06T 2207/10016* (2013.01); *G06T 2207/10024* (2013.01)

(58) Field of Classification Search
  USPC .................................................. 345/240.02
  See application file for complete search history.

(56) References Cited

U.S. PATENT DOCUMENTS

| | | |
|---|---|---|
| 6,628,715 B1 | 9/2003 | Iu |
| 7,103,231 B2 | 9/2006 | Cornog |
| 7,991,196 B2 | 8/2011 | Tener |
| 8,013,909 B2 | 9/2011 | Nikkanen |
| 8,150,194 B2 | 4/2012 | Fujibayashi |
| 8,160,149 B2 | 4/2012 | Demos |
| 8,208,563 B2 | 6/2012 | Dane |
| 8,358,696 B2 | 1/2013 | Bukin |
| 8,462,266 B2 | 6/2013 | Ueno |
| 8,559,517 B2 | 10/2013 | Ogino |
| 8,634,463 B2 | 1/2014 | Shi |
| 8,718,143 B2 | 5/2014 | Chen |
| 8,768,103 B2 | 7/2014 | Ogino |
| 9,031,131 B1 | 5/2015 | Patankar |
| 9,129,399 B2 | 9/2015 | Jin |
| 9,191,682 B2 | 11/2015 | Margerm |
| 2005/0249288 A1 | 11/2005 | Ha |
| 2007/0071100 A1 | 3/2007 | Shi |
| 2007/0211800 A1 | 9/2007 | Shi |
| 2009/0148058 A1 | 6/2009 | Dane |
| 2009/0161011 A1 | 6/2009 | Hurwitz |
| 2009/0183200 A1* | 7/2009 | Gritton ............ H04N 7/165 725/37 |
| 2010/0079669 A1 | 4/2010 | Hattori |
| 2010/0177239 A1 | 7/2010 | Servais |
| 2010/0260255 A1 | 10/2010 | Sannidhi |
| 2011/0206127 A1 | 8/2011 | Nguyen |
| 2013/0002947 A1 | 1/2013 | Mikhalenkov |
| 2013/0279590 A1 | 10/2013 | Chen |
| 2014/0307166 A1 | 10/2014 | Glen |
| 2015/0116513 A1 | 4/2015 | Chen |
| 2015/0254823 A1 | 9/2015 | Atkins |
| 2015/0341658 A1 | 11/2015 | Xi |

OTHER PUBLICATIONS

Cetin, M. et al "An Adaptive True Motion Estimation Algorithm for Frame Rate Conversion of High Definition Video" Pattern Recognition (ICPR), 20th International Conference, pp. 4109-4112, Aug. 2010.

Huang, A.M. et al "Correlation-Based Motion Vector Processing with Adaptive Interpolation Scheme for Motion-Compensated Frame Interpolation" IEEE Transactions on Image Processing, vol. 18, No. 4, Apr. 2009, pp. 740-752.

Pesquet-Popescu, B. et al "Motion Estimation Techniques" Telecom ParisTech, pp. 1-76, 2014.

Youn, J. et al "Motion Vector Refinement for High-Performance Transcoding" IEEE Transactions on Multimedia, vol. 1, No. 1, Mar. 1999, pp. 30-40.

Tasdizen, O. et al "Recursive Dynamically Variable Step Search Motion Estimation Algorithm for High Definition Video" Pattern Recognition (ICPR) 20th International Conference, pp. 2354-2357, Aug. 2010.

Shimano, M. et al "Video Temporal Super-Resolution Based on Self-Similarity" Advanced Topics in Computer Vision, pp. 411-430, Dec. 2013.

Lu, Q. et al "Motion-Compensated Frame Interpolation with Multiframe-Based Occlusion Handling" Jul. 2015, Display Technology, vol. 12, No. 1, pp. 45-54.

* cited by examiner

DYNAMIC ADJUSTMENT OF FRAME RATE CONVERSION SETTINGS

TECHNOLOGY

The present invention relates generally to images. More particularly, an embodiment of the present invention relates to dynamic adjustment of frame rate conversion settings.

BACKGROUND

Image interpolation, which computes a set of plausible interpolated images using two or more adjacent images, has varied applications including but not limited to frame rate conversion (FRC) between different broadcast standards, synthesis of virtual views, animating still images and so on.

Some TV manufacturing companies incorporate built-in motion interpolation technology in their products to perform FRC. A mechanism for FRC can be as simple as merely replicating received images to achieve the desired frame rate. For example, a TV running at an image refresh rate of 120 Hz and receiving a 30 Hz image sequence may simply display each image four consecutive times. The advantage of this solution is that the complexity of the system is very low, at the expense of possibly resulting in motion judder.

Complicated systems can be designed for motion interpolation. However, computational costs of such techniques can be quite high and can even result in noticeable lags in viewing image sequences involving motions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
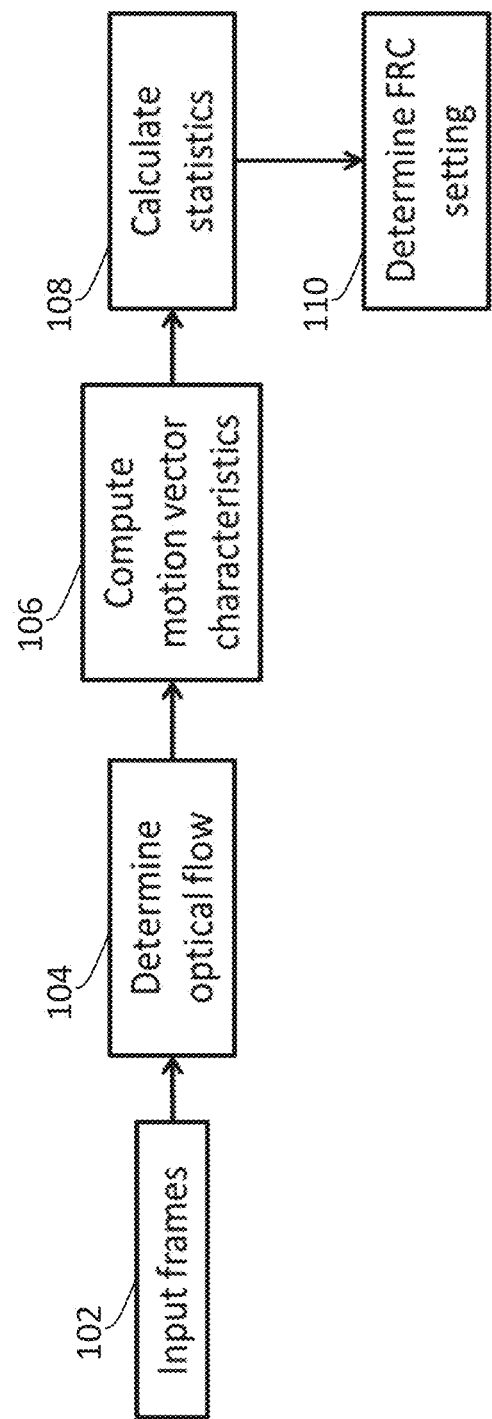
FIG. 1A and FIG. 1B illustrate example process flows for determining motion characteristics of content (e.g., used in determining optimal FRC operational modes, used in other operations, etc.)

Example embodiments, which relate to dynamic adjustment of frame rate conversion settings, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. FRAME RATE CONVERSION
3. DETERMINING OPTIMAL FRC MODES BASED IMAGE CONTENT ANALYSIS
4. EXAMPLE VIDEO ENCODERS AND DECODERS
5. EXAMPLE PROCESS FLOWS
6. IMPLEMENTATION MECHANISMS—HARDWARE OVERVIEW
7. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Example embodiments described herein relate to encoding video data with motion characteristics of the video data. The motion characteristics of the video data can be used in a variety of image processing/rendering operations, including but not necessarily limited to only, any of: FRC operations, operations that guide two-dimensional (2D) to three-dimensional (3D) depth extraction, virtual reality (VR) anti-nausea algorithms, power saving algorithms, etc. By way of example but not limitation, based on image content visually depicted in one or more images, one or more motion characteristics related to the one or more images are determined. Based at least in part on the one or more motion characteristics related to the one or more images, a motion characteristics metadata portion is determined. The content motion characteristics portion is to be used for determining an optimal FRC operational mode with a downstream device for the one or more images. The one or more images are encoded into a video stream. The motion characteristics metadata portion is encoded into the video stream as a part of image metadata. The video stream is caused to be transmitted to the downstream device.

Example embodiments described herein relate to performing FRC operations using motion characteristics metadata. One or more images and a motion characteristics metadata portion is decoded from a video stream. The motion characteristics metadata portion is generated by an upstream device for the one or more images based at least in part on one or more motion characteristics related to the one or more images. The one or more motion characteristics are determined based on image content visually depicted in one or more images. The motion characteristics metadata portion is used to determine an optimal FRC operational mode for the one or more images. The optimal FRC operational mode is operated by the downstream device to generate, based on the one or more images, one or more additional images in addition to the one or more images. The one or more images and the one or more additional images are caused to be rendered on a display device.

In some example embodiments, mechanisms as described herein form a part of a media processing system, including but not limited to any of: cloud-based server, mobile device, encoding device, transcoding device, decoding device, media device, CAVE-type system or wall-sized display, video game device, display device, media player, media server, media production system, camera systems, home-based systems, communication devices, video processing system, video codec system, studio system, streaming server, content service system, handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Frame Rate Conversion

Image interpolation techniques that are based on optical flow can have varying levels of complexity depending on how an optical flow field is generated such as whether the optical flow field is dense, pixel-based, block-based, how many adjacent images in the past are used, how many adjacent images in the future are used, and so on. As used herein, adjacent images used for image interpolation and/or image replication may refer to (e.g., non-interpolated, non-replicated, etc.) images that are not generated from other images by image interpolation and/or image replication.

In some operational scenarios, correspondences can be computed between adjacent images in a video stream based on optical flow computations. Warping can be performed on the adjacent images to get estimates for the interpolated images. Due to potential ambiguities in computing correspondences in optical flow, however, some of these techniques may need to rely on computationally expensive optimization that involves tuning numerous parameters and thus takes long computational times to find optimal FRC settings. While using a large amount of information for computing optical flow may lead to better image interpolation results (e.g., less motion judder, less motion blur, etc.), the economic cost and the computational cost in such an approach can be high. Furthermore, in practice the high cost computation may result in perceptible time lags in viewing image sequences involving relatively high motion image content.

In some embodiments, a display system may implement different frame rate conversion (FRC) operational modes, any of which may be selected by the display system automatically without user input, by a user manually, according to the user's personal preferences, etc. In a first FRC operational mode (e.g., OFF), the display system may operate frame rate conversion without performing image interpolation and merely replicate received images. In one or more second FRC operational modes (e.g., LOW, MEDIUM, HIGH, etc.), the display system may operate frame rate conversion with various degrees of complexities. For example, in a FRC LOW mode, the display system may operate frame rate conversion by replicating most received images (3 out of 4 frames while converting a 30 Hz input frame rate to a 120 Hz display-device-specific frame rate) and applying image interpolation only to a small subset of received images (1 out of 4 frames while converting a 30 Hz input frame rate to a 120 Hz display-device-specific frame rate). On the other hand, in a FRC HIGH mode, the display system may operate frame rate conversion by applying image interpolation to most received images, replicating none of received images or replicating only a small subset of the received images.

In some embodiments, FRC operational modes as described herein may further comprise FRC LOW, intermediate FRC operational modes, etc., in which image interpolations and image replications are applied to (e.g., static, fixed, dynamically settable, etc.) various numbers of received images.

In many operational scenarios, when the display system operates in a non FRC OFF mode such as the FRC HIGH mode, worse interpolation results can be produced than when the display system would operate in the FRC OFF mode. Although this sounds counter-intuitive, the worse interpolation results can occur with relatively high probabilities. This is so because in the FRC HIGH mode, the display system performs complex operations (e.g., computing optical flow using multiple adjacent images, etc.) to determine correspondences. However, if input image content has random motions, then it may become very difficult to estimate correspondences between pixels, pixel blocks, etc., of different received images. Example random motions may include, but are not limited to only, any of: rain drops, snow falling, dust storm, sand storm, wind blowing leaves away, fast fight sequences, etc.

In addition, optimization techniques used for computing optical flow (e.g., calculating the correspondences, etc.) may not converge properly, and thus may produce irregular and incorrect estimated motions of pixels/blocks of interpolated images. The irregular and incorrect estimated motions may cause unwanted visual artifacts to be produced in rendering the interpolated images.

Thus, for input image content containing random motions, it is desirable to watch a time sequence of received images mixed with replicated images generated in the FRC OFF mode, as the replicated images would be relatively free of objectionable visual artifacts that could otherwise be produced in interpolated images due to the irregular and incorrect estimated motions.

Techniques as described herein can be dynamically applied to avoid/reduce performing image interpolation operations for input image content that is susceptible to generating objectionable visual artifacts. Even in operational scenarios in which image interpolation operations are suitable (or input image content that is not susceptible to generating objectionable visual artifacts), these techniques can be dynamically applied to select the best FRC operational mode possible (e.g., with the best strength/level for the image interpolation operations, etc.) for performing the image interpolation operations.

In some embodiments, a display system under techniques as described herein can implement a mechanism that dynamically adjusts FRC operational modes depending on actual motion types found in the input image content. Motion statistics including but not limited to magnitudes and directions pertaining to motion vectors between adjacent images may be computed and/or collected, and may be used to predict and/or select the best FRC operational mode.

For example, in operational scenarios in which relatively smooth motions (including but not limited to relatively static or stationary scenes/images) are detected from two or more adjacent images, based on motion statistics indicating the relatively smooth motions, the FRC HIGH mode may be predicted and/or selected. In some embodiments, the relatively smooth motions may be measured or determined so when motion vectors computed from adjacent images in the input image content have similar, relatively uniform, and/or converging magnitudes and directions with variances that do not exceed corresponding random motion thresholds. As a result, the display system can operate with relatively strong image interpolation that generates interpolated images around or in between the adjacent images, thereby providing a better viewing experience while watching the input image content associated with accurate and fast motion estimation for the relatively smooth motions.

On the other hand, in operational scenarios in which relatively random motions are detected from two or more adjacent images, based on motion statistics indicating the relatively random motions, the FRC OFF mode may be predicted and/or selected. In some embodiments, the relatively random motions may be measured or determined so when the motion vectors have different magnitudes and directions with variances that exceed the corresponding random motion thresholds. As a result, the display system can operate without image interpolation and avoid generate interpolated images around or in between the adjacent images, thereby avoiding generating unwanted visual artifacts associated with incorrect motion estimation, which are likely to be generated under other approaches that blindly relies on (e.g., relatively strong, etc.) image interpolation for frame rate conversion.

3. Determining Optimal FRC Modes Based Image Content Analysis

FIG. 1A illustrates an example process flow that can be used to determine motion characteristics of content. The motion characteristics of content may be used in determining optimal FRC operational modes, used in other operations, etc., in a display system with respect to a given image sequence. In some embodiments, one or more computing devices or components (e.g., an encoding device/module, a transcoding device/module, a decoding device/module, a media device/module, etc.) may perform this process flow. Example display systems may include, but are not necessarily limited to only, any combination of: video encoders, video decoders, video streaming servers, video streaming clients, set-top devices, video decoders, display devices, storage devices, etc.

In block 102, the display system receives the image sequence comprising one or more sets of images ("input frames") that support an input frame rate. Each set of images may represent two or more adjacent images (or two or more adjacent input frames) along a common time reference (e.g., a normal playing time, etc.) represented in the image sequence. As used herein, adjacent images refer to non-interpolated, non-replicated images that are timewise next (e.g., consecutive, sequential, immediately following, immediately preceding, etc.) to each other (or one another) in the image sequence. In some embodiments, a set of images as described herein may form a subdivision of a scene, a single scene, multiple scenes, a single group of pictures (GOP), multiple GOPs, etc.

In block 104, the display system calculates an optical flow between two or more adjacent images in a (e.g., each, etc.) set of images and generates an optical flow field to represent the optical flow of pixels, pixel blocks, etc. Correspondences among (or between) the adjacent images may be determined based on one or more optical flow equations. The optical flow field may be pixel based, pixel-block based, etc. The optical flow field may be used to estimate patterns of apparent motions of different objects, different clusters of objects, different spatial regions, etc., depicted in the adjacent images.

Any combination of one or more optical flow techniques may be used to determine the optical flow and/or to generate the corresponding optical flow field. Example optical flow techniques may include, but are not necessarily limited to only, any of: dense optical flow techniques, pixel-based techniques, block-based techniques, techniques that estimate the apparent motions by using only past images (relative to a currently decoded, processed and/or designated image), techniques that estimate the apparent motions by using only future images (relative to a currently decoded, processed and/or designated image), techniques that estimate the apparent motions by any combination or number of past and future images (relative to a currently decoded, processed and/or designated image), etc. Additionally, optionally, or alternatively, motion estimation as described herein can be performed from only individual (decoded) images, directly from a video bitstream (as received by the display system) that encodes the image sequence, or a combination of the foregoing. For example, motion estimation under techniques as described herein may be solely derived from individual images (e.g., uncompressed images, etc.). Additionally, optionally, or alternatively, at least a part of motion estimation under techniques as described herein may be based on motion information such as (e.g., block-based, etc.) GOP motion information decoded directly from a video stream (or one or more media data bitstreams) encoded with the images.

In block 106, the display system computes, based on motion vectors estimated from the patterns of the apparent motions of the different objects in the adjacent images, characteristics of motion vectors in the adjacent images.

In some embodiments, a motion vector can be computed using a directional offset (or displacement) of an object from the object's reference coordinates. The directional offset or displacement may be derived from coordinates of pixels representing the object in a first image (e.g., a currently decoded, processed and/or designated image, etc.) of the adjacent images relative to reference coordinates of correspondence pixels representing the same object in one or more second first images (e.g., one or more reference images, etc.) of the adjacent images.

For example, the directional offset or displacement may be derived as a difference between (a center of mass in) the coordinates of the pixels representing the object in the first image (or the current image) and (a center of mass in) the reference coordinates of the correspondence pixels representing the same object in the one or more second first images (or the reference images).

In some embodiments, characteristics of a motion vector as described herein may comprise a magnitude component and a direction component.

In block 108, the display system, based on the characteristics of the motion vectors in the adjacent images, determines/calculates statistics of the motion vectors in the adjacent images. Example motion vector statistics may include, but are not necessarily limited to only, any of: distributions, mean values, standard deviations, group values, kurtoses, skews, etc., in or among magnitude components and/or direction components of the motion vectors. In some embodiments, for adjacent images that have relatively high standard deviation values in motions (as represented by the motion vectors), the motions in the adjacent images have a relatively high likelihood of being random, as the motions are relatively non-consistent among themselves. Conversely, for adjacent images that have relatively low standard deviation values in motions, the motions in the adjacent images have a relatively low likelihood of being random, as the motions are relatively consistent among themselves. Apart from standard deviations, other characteristics can be used in motion vector characteristics analysis and/or motion vector statistics analysis. These other characteristics may include, but are not necessarily limited to only, any of: histograms or distributions, peaks in histograms or distributions, higher order moments of statistical distributions such as kurtoses, skews, etc.

For example, in some embodiments, the display system optionally or alternatively computes, for the adjacent images, other statistics such as a histogram of the magnitude components of the motion vectors and/or a histogram of the direction components of the motion vectors. The display system can further analyze the histograms to determine the patterns of the apparent motions of the objects depicted in the adjacent images. For instance, if the histogram of the direction components of the motion vectors is relatively uniform in counts across bins of the histogram, then it may be inferred by the display system that the motions depicted in the adjacent images are relatively random because the motion vectors in the adjacent images exhibit a relatively uniform distribution of different directions. Conversely, if the histogram of the direction components of the motion vectors has a significant peak in counts across bins of the histogram, then it may be inferred by the display system that the motions are not random but relatively smooth (or regular) because the motion vectors exhibit a certain relatively narrow directionality such as caused by camera panning.

In block 110, the display system dynamically adjusts/determines the best FRC operational mode (or the best FRC setting) for the set of images based at least in part on statistics of motion vectors and/or histograms of magnitude components and/or direction components of motion vectors in all adjacent images of the set of images.

In operational scenarios in which the set of images comprises a plenty (e.g., exceeding a random motion frame number threshold, etc.) of relatively random motions (e.g., in a scene, in a GOP, etc.) and in which motion estimation in FRC operational modes that perform image interpolation is not reliable, the display system (e.g., dynamically, etc.) adjusts/determines that the FRC OFF mode is the best FRC operational mode to be used to generate additional images in addition to the set of images for the purpose of converting from the input frame rate in the set of images to a device-specific frame rate as appropriate in the display system. Although the FRC OFF mode may create motion blur, such effects may not be noticeable, especially in high motion sequences (e.g., random motion sequences, etc.). In fact, it is desirable to render such high motion sequences in the FRC OFF mode, rather than in the FRC HIGH mode, in order to avoid or reduce unwanted visual artifacts associated with incorrect motion estimation.

In other operational scenarios in which the set of images does not comprises a plenty (e.g., not exceeding the random motion frame number threshold, etc.) of relatively random motions (e.g., in a scene, in a GOP, etc.) and in which motion estimation in FRC operational modes that perform image interpolation is reliable, the display system (e.g., dynamically, etc.) adjusts/determines that a FRC operational mode such as the FRC HIGH mode, the FRC MED mode, the FRC LOW mode, etc., is the best FRC operational mode to be used to generate additional images in addition to the set of images for the purpose of converting from the input frame rate in the set of images to a device-specific frame rate as appropriate in the display system.

Figure 1B:
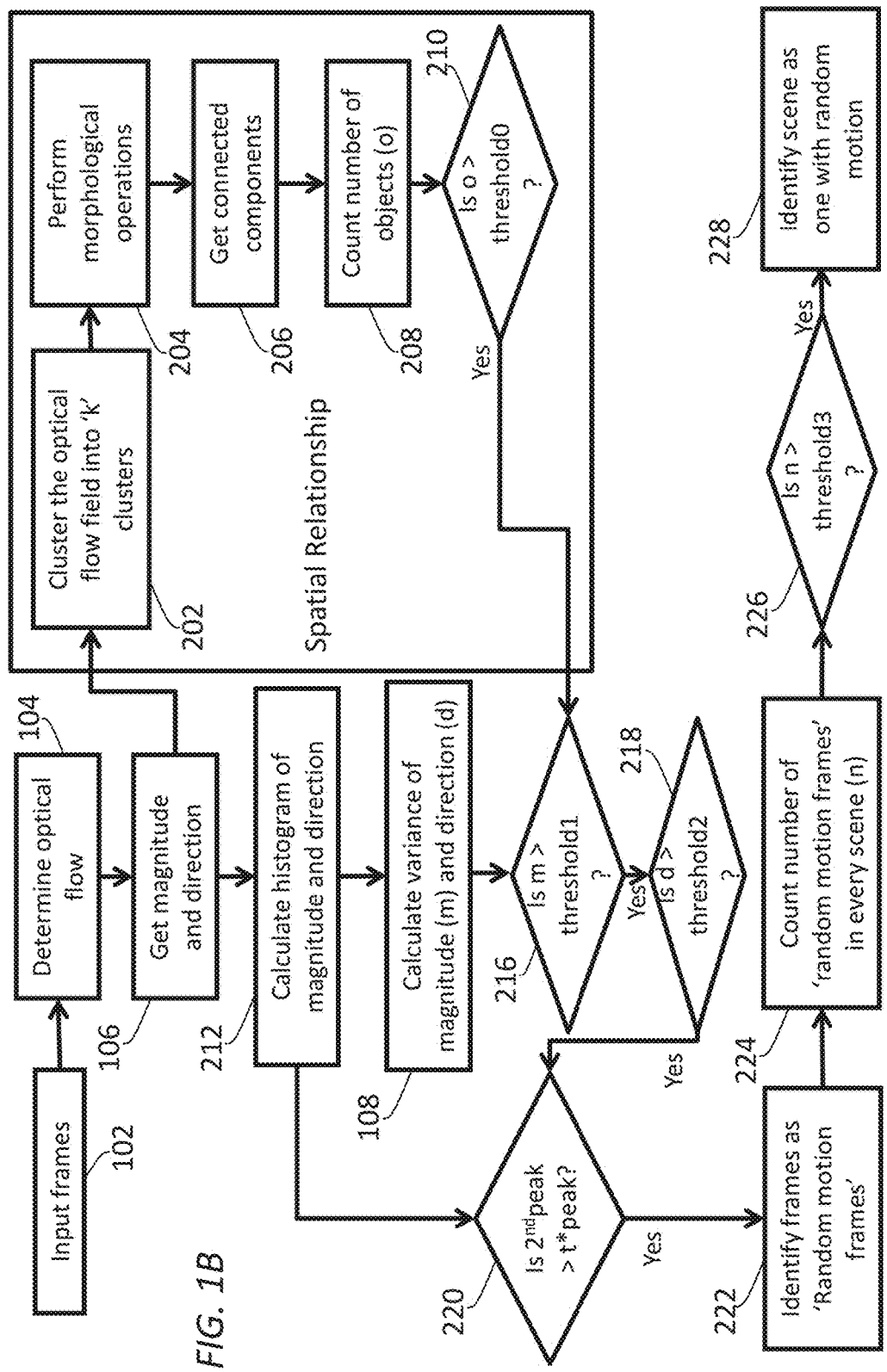

FIG. 1B illustrates an example process flow that can be used to determine whether a set of images should be classified as containing random motions. In some embodiments, one or more computing devices or components (e.g., an encoding device/module, a transcoding device/module, a decoding device/module, a media device/module, etc.) may perform this process flow.

In block 102 (which may be the same as block 102 in FIG. 1A), a display system receives an image sequence comprising one or more sets of images ("input frames") that support an input frame rate. Each set of images may comprise two or more adjacent images along a common time reference represented in the image sequence.

In block 104 (which may be the same as block 104 in FIG. 1A), the display system calculates an optical flow in two or more adjacent images in a set of images in the one or more sets of images and generates an optical flow field to represent the optical flow in the adjacent images.

In block 106 (which may be the same as block 106 in FIG. 1A), the display system computes, based on motion vectors estimated from patterns of apparent motions of different objects in the optical flow field, characteristics of motion vectors in the adjacent images. In some embodiments, characteristics of a motion vector as described herein may comprise a magnitude component and a direction component.

In some embodiments, the process flow of FIG. 1B may use a sub-process to analyze spatial relationships of pixels, blocks, etc., in the optical flow field of the adjacent images. This sub-process may be implemented as either a part (e.g., in block 106) of the process flow of FIG. 1B or a separate process flow operating in addition to or in conjunction with the process flow (e.g., in block 106) of FIG. 1B.

As illustrated in FIG. 1B, in block 202, the display system uses the optical flow field to generate a cluster map that comprises a plurality of clusters (denoted as 'K' clusters). The optical flow field may comprise a (e.g., two-dimensional, spherical, etc.) field of motion vectors computed from pixel values of adjacent images based on one or more optical flow equations. By way of example but not limitation, the field of motion vectors in the optical flow field may comprise a respective motion vector at each pixel position of a set of pixel positions spanning an image. The display system can apply optical flow analysis tools to the field of motion vectors as represented in the optical flow field, and to recognize the plurality of clusters from the field of motion vectors thereby generating the cluster map that comprises the plurality of clusters. In some embodiments, each cluster in the plurality of clusters (or in the cluster map), as detected from the optical flow field, may comprise one or more (e.g., connected, spatially distributed, etc.) components or objects that are originally depicted in the images.

In block 204, the display system performs morphological operations on the plurality of clusters in the cluster map. The cluster map may comprise a (e.g., two-dimensional, spherical, etc.) field of mapped values derived from the field of motion vectors in the optical flow field. By way of example but not limitation, the field of mapped values in the cluster map may comprise a respective map value at each pixel position of a set of pixel positions spanning an image. In some embodiments, these morphological operations may be (e.g., non-grayscale, grayscale, etc.) operations acting on the field of mapped values in the cluster map at an individual pixel level, at an individual pixel sub-block level, at an individual pixel block level, etc. Example morphological operations may include, but are not necessarily limited to only, any of: erosion operations, dilation operations, opening operations, closing operations, etc.

In block 206, the display system uses the cluster map as having been operated with the morphological operations to identify individual (e.g., connected, spatially distributed, etc.) components or objects ("connected components") in each cluster in the plurality of clusters in the cluster map.

Figure 2A:
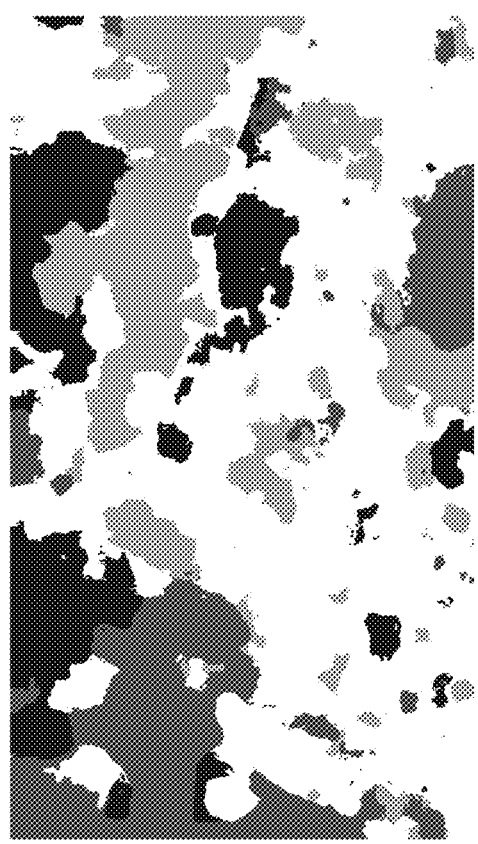
FIG. 2A and FIG. 2B illustrate example cluster maps in which different numbers of components/objects are detected.
Figure 2B:
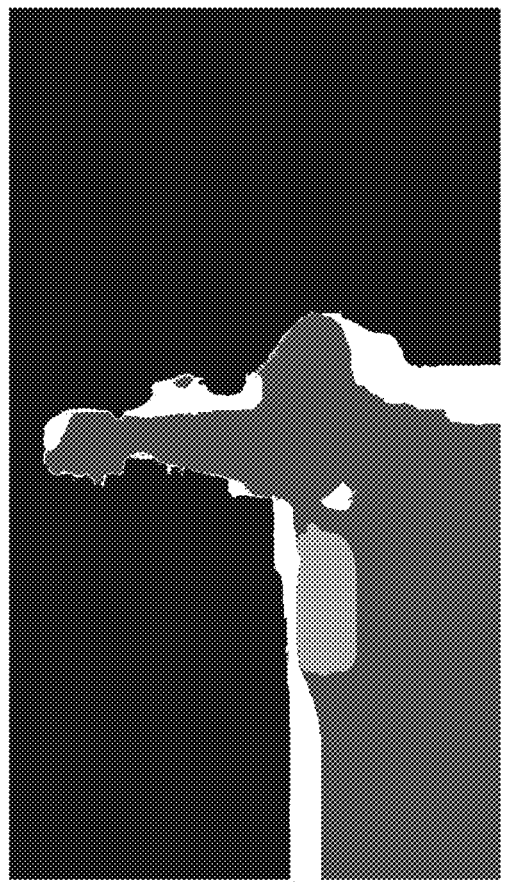

In block 208, the display system counts (e.g., connected, spatially distributed, etc.) components/objects, as detected from the optical flow field using the foregoing operations, to generate a total number of components/objects in the adjacent images. FIG. 2A illustrates a first example cluster map in which a relatively high number (e.g., 187, etc.) of components/objects are detected, whereas FIG. 2B illustrates a second example cluster map in which a relatively low number (e.g., 23, etc.) of components/objects are detected.

In block 210, the display system determines whether the total number of components/objects, as detected from the optical flow field computed from the adjacent images, exceeds a specific (e.g., connected, spatially distributed, etc.) component number threshold (e.g., denoted as "threshold 0," 30, 40, 50, 100, etc.).

In some embodiments, in response to determining that the total number of components/objects in the optical flow field of the adjacent images exceeds the specific component number threshold, the display system proceeds to perform further statistical analyses on motion vectors represented in the optical flow field to determine whether the adjacent images are to be classified as containing random motions or not.

In some embodiments, in response to determining that the total number of components/objects in the optical flow field of the adjacent images does not exceed the specific component number threshold, the display system avoids performing statistical analyses on the motion vectors represented in the optical flow field and directly determines that the adjacent images are to be classified as not containing random motions but rather are to be classified as containing smooth (or non-random) motions. As a result of this determination, in some embodiments, operations in blocks 212, 108, 216, 218, 220, 222, etc., may be omitted for the adjacent images in response to determining that the total number of components/objects in the optical flow field of the adjacent images does not exceed the specific component number threshold. However, in some other embodiments, some or all operations in blocks 212, 108, 216, 218, 220, 222, etc., may still be performed for the adjacent images in response to determining that the total number of components/objects in the optical flow field of the adjacent images does not exceed the specific component number threshold.

In block 212, the display system computes, based on the characteristics of the motion vectors (e.g., as represented in the optical flow field, etc.) in the adjacent images, a histogram of the magnitude components of the motion vectors and/or a histogram of the direction components of the motion vectors.

In block 108, the display system, based on the characteristics of the motion vectors (e.g., as represented in the optical flow field, etc.) in the adjacent images, further determines/calculates statistics (e.g., variances, etc.) of the motion vectors in the adjacent images.

In block 216, the display system determines whether a variance of magnitude components of motion vectors in the optical flow field of the adjacent images exceeds a specific motion magnitude variance threshold (e.g., denoted as "threshold 1," etc.).

The variance may be represented by any combination of standard deviations, kurtoses, skews, etc. Different types of variance values may be compared with different types of thresholds. For example, the standard deviations of the magnitude components may be compared with the specific motion magnitude variance threshold (or a component value thereof) in the form of a magnitude standard deviation threshold. Additionally, optionally, or alternatively, the kurtoses of the magnitude components may be compared with the specific motion magnitude variance threshold (or a component value thereof) in the form of a magnitude kurtosis threshold. Additionally, optionally, or alternatively, the skews of the magnitude components may be compared with the specific motion magnitude variance threshold (or a component value thereof) in the form of a magnitude skew threshold. A threshold as described herein may be single valued or multi-valued in various embodiments.

In some embodiments, in response to determining that the variance of magnitude components of motion vectors in the optical flow field of the adjacent images exceeds the specific motion magnitude variance threshold, the display system proceeds to perform further statistical analyses on the motion vectors represented in the optical flow field to determine whether the adjacent images are to be classified as containing random motions or not.

In some embodiments, in response to determining that the variance of magnitude components of motion vectors in the optical flow field of the adjacent images does not exceed the specific motion magnitude variance threshold, the display system avoids performing further statistical analyses on the motion vectors represented in the optical flow field and directly determines that the adjacent images are to be classified as not containing random motions but rather are to be classified as containing smooth (or non-random) motions. As a result of this determination, in some embodiments, operations in blocks 202, 204, 206, 208, 210, 212, 218, 220, 222, etc., may be omitted for the adjacent images in response to determining that the variance of magnitude components of motion vectors in the optical flow field of the adjacent images does not exceed the specific motion magnitude variance threshold. However, in some other embodiments, some or all operations in blocks 202, 204, 206, 208, 210, 212, 218, 220, 222, etc., may still be performed for the adjacent images in response to determining that the variance of magnitude components of motion vectors in the optical flow field of the adjacent images does not exceed the specific motion magnitude variance threshold.

In block 218, the display system determines whether a variance of direction components of motion vectors in the optical flow field of the adjacent images exceeds a specific motion direction variance threshold (e.g., denoted as "threshold 2," etc.).

For example, the standard deviations of the direction components may be compared with the specific motion direction variance threshold (or a component value thereof) in the form of a direction standard deviation threshold. Additionally, optionally, or alternatively, the kurtoses of the direction components may be compared with the specific motion direction variance threshold (or a component value thereof) in the form of a direction kurtosis threshold. Additionally, optionally, or alternatively, the skews of the direction components may be compared with the specific motion direction variance threshold (or a component value thereof) in the form of a direction skew threshold.

In some embodiments, in response to determining that the variance of direction components of motion vectors in the optical flow field of the adjacent images exceeds the specific motion direction variance threshold, the display system proceeds to perform further statistical analyses on the motion vectors represented in the optical flow field to determine whether the adjacent images are to be classified as containing random motions or not.

In some embodiments, in response to determining that the variance of direction components of motion vectors in the optical flow field of the adjacent images does not exceed the specific motion direction variance threshold, the display system avoids performing further statistical analyses on the motion vectors represented in the optical flow field and directly determines that the adjacent images are to be classified as not containing random motions but rather are to be classified as containing smooth (or non-random) motions. As a result of this determination, in some embodiments, operations in blocks 202, 204, 206, 208, 210, 212, 216, 220, 222, etc., may be omitted for the adjacent images in response to determining that the variance of direction components of motion vectors in the optical flow field of the adjacent images does not exceed the specific motion direction variance threshold. However, in some other embodiments, some or all operations in blocks 202, 204, 206, 208, 210, 212, 216, 220, 222, etc., may still be performed for the adjacent images in response to determining that the variance of direction components of motion vectors in the optical flow field of the adjacent images does not exceed the specific motion direction variance threshold.

In block 220, the display system identifies two or more magnitude peaks in the histogram of the magnitude components of the motion vectors and/or two or more direction peaks in the histogram of the direction components of the motion vectors. The two or more magnitude peaks may comprise the highest magnitude peak and the second highest magnitude peak. The highest magnitude peak may correspond to the highest count over a single bin, over two bins, etc., of the magnitude component histogram, whereas the second highest magnitude peak may correspond to the second highest count over the same number of bin(s) of the magnitude component histogram over which the highest magnitude peak is measured. Additionally, optionally, or alternatively, the two or more direction peaks may comprise the highest direction peak and the second highest direction peak. The highest direction peak may correspond to the highest count over a single bin, over two bins, etc., of the direction component histogram, whereas the second highest direction peak may correspond to the second highest count over the same number of bin(s) of the direction component histogram over which the highest direction peak is measured.

In some embodiments, the display system determines whether the second highest magnitude peak exceeds a specific peak threshold factor times the highest magnitude peak. Additionally, optionally, or alternatively, the display system determines whether the second highest direction peak exceeds a specific peak threshold factor times the highest direction peak.

In some embodiments, in response to determining either that the second highest magnitude peak exceeds the specific peak threshold factor times the highest magnitude peak or that the second highest magnitude peak exceeds the specific peak threshold factor times the highest magnitude peak in block 220, the display system proceeds to block 222 and identifies/classifies the adjacent images as images that contain random motions (or random motion images/frames). Otherwise, in block 220, in response to determining both that the second highest magnitude peak does not exceed the specific peak threshold factor times the highest magnitude peak and that the second highest magnitude peak does not exceed the specific peak threshold factor times the highest magnitude peak, the display system identifies/classifies the adjacent images as images that contain smooth motions (or non-random motion images/frames).

In some embodiments, in response to determining both that the second highest magnitude peak exceeds the specific peak threshold factor times the highest magnitude peak and that the second highest magnitude peak exceeds the specific peak threshold factor times the highest magnitude peak in block 220, the display system proceeds to block 222 and identifies/classifies the adjacent images as images that contain random motions (or random motion images/frames). Otherwise, in block 220, in response to determining either that the second highest magnitude peak does not exceed the specific peak threshold factor times the highest magnitude peak or that the second highest magnitude peak does not exceed the specific peak threshold factor times the highest magnitude peak, the display system identifies/classifies the adjacent images as images that contain smooth motions (or non-random motion images/frames).

The display system may repeat the operations from blocks 104 and 222 for all other adjacent images in the set of images. In some embodiments, some or all of these operations may be performed with respect to a currently decoded, processed and/or designated image (or a current image) in relation to one or more images adjacent to the current image.

In block 224, the display system counts all random motion images/frames in the set of images to generate a total number of random motion images/frames (denoted as "n") in the set of images. In some embodiments, the total number of random motion images/frames may be computed as an absolute number. In some embodiments, the total number of random motion images/frames may be computed as a relative number, for example, as a ratio of the total number of random motion images/frames over the total number of images in the set of images.

In block 226, the display system determines whether the total number of random motion images/frames in the set of images exceeds a specific random motion frame number threshold (e.g., denoted as "threshold 3," etc.). In some embodiments, the specific random motion frame number threshold may be specified as an absolute number. In some embodiments, the specific random motion frame number threshold may be specified as a relative number, for example, as a ratio of a threshold number of random motion images/frames over the total number of images in the set of images.

In some embodiments, in response to determining that the total number of random motion images/frames in the set of images exceeds the specific random motion frame number threshold in block 226, the display system proceeds to block 228 and identifies/classifies the set of images as (e.g., a scene, a GOP, etc.) containing random motions (or random motion images/frames). Otherwise, in block 228, in response to determining that the total number of random motion images/frames in the set of images does not exceed the specific random motion frame number threshold in block 226, the display system identifies/classifies the set of images as (e.g., a scene, a GOP, etc.) containing smooth motions (or non-random motion images/frames).

In some embodiments, some or all of the foregoing operations may be performed with respect to a currently decoded, processed and/or designated set of images (a current set of images). The display system may repeat the foregoing operations for other received sets of images.

Under techniques as described herein, selecting/adjusting FRC operational modes (or FRC settings) based on motion statistics derived from (pixel values of) images can also be categorized as a classification problem in which a classifier may be used to determine the best FRC operational mode for any given set of images. The inputs to the classifier may be motion statistics (or statistics of motion vectors) computed from each of one or more sets of images, whereas the outputs of the classifier may be respective FRC operational modes (or respective FRC settings) for the one or more sets of images. These respective FRC operational modes may comprise two or more different FRC operational modes (e.g., FRC OFF, FRC LOW, FRC, MED, FRC HIGH, etc.) where some of the sets of images are classified as containing smooth motions and some others of the sets of images are classified as containing random motions.

For the purpose of illustration only, it has been described that FRC related operational modes supported by techniques as described herein include an FRC OFF mode, an FRC HIGH mode, an FRC MED mode, and an FRC LOW mode. It should be noted that in various embodiments, more or fewer FRC related operational modes may be determined and used per spatial region, per image, per scene, etc., based on FRC-related analyses on image content in an image or a spatial region thereof, in a scene, etc. In an example, in some embodiments, the FRC related modes supported by techniques as described herein may include only an FRC OFF mode and an FRC ON mode. In another example, in some embodiments, the FRC related modes supported by techniques as described herein may include only an FRC OFF mode, an FRC HIGH mode, and an FRC LOW mode. In yet another example, in some embodiments, the FRC related modes supported by techniques as described herein may include additional FRC related modes in addition to an FRC OFF mode, an FRC HIGH mode, an FRC MED mode, and an FRC LOW mode.

Any combination of one or more of a wide variety of classification techniques such as decision tree, support vector machine (SVM), random forest classifier, etc., may be used to classify a given set of images into a respective FRC operational mode optimally selected/determined for the set of images.

In some embodiments, an upstream device (e.g., a video encoder, a studio-based system, a broadcast system, a media streaming server, a cloud-based system, a set-top box, etc.) may classify (or pre-classify) an image sequence comprising sets of images in a media program before transmitting the images to downstream devices. For example, in a precomputing stage (e.g., offline, during encoding, before encoding, etc.), the upstream device may determine complexity of motions in the image sequence and generate motion characteristics metadata for the image sequence based on the complexity of motions determined in content depicted in the image sequence. The complexity of motions in the image sequence can be estimated with optical flow techniques and/or other motion estimation techniques. In some embodiments, the upstream device determines an optimal FRC operational mode per image. Additionally, optionally, or alternatively, in some embodiments, the upstream device determines or maintains an optimal (constant) FRC operational mode for an entire scene comprising multiple (e.g., consecutive, sequential, etc.) images; changes in FRC operational modes may be allowed to occur only at scene cuts or scene boundaries between two different adjacent scenes (or at the beginning of a media program comprising the scenes).

The upstream device may compute only a single value (e.g., a single-valued FRC flag, etc.) representing the complexity of motion per image, per scene, etc. Additionally, optionally, or alternatively, the upstream device may compute a multi-valued complexity factor (e.g., a multi-valued FRC flag, etc.) per image, per scene, etc. By way of example but not limitation, the multi-valued complexity factor may be a set of vectors describing the complexity of the motion along multiple axes or dimensions, which may include, but are not necessarily limited to only, any of: translation, rotation, number of different motion clusters, etc.

Some or all of optical flow fields, cluster maps with and/or without morphological operations, number of objects directly or indirectly detected from the optical flow fields, histograms and/or distributions of motion vectors, histograms and/or distributions of characteristics (e.g., standard deviations, kurtoses, skews, etc.) of motion vectors, optimal FRC operational modes determined by one or more classifying processes or classifiers, etc., can be used to generate the motion characteristics metadata at the encoder side (e.g., by the upstream device).

In some embodiments, the motion characteristics metadata may include an FRC flag, an FRC data field, etc., that can directly or indirectly indicate whether a particular FRC operational mode such as an FRC OFF mode, an FRC HIGH mode, an FRC LOW mode, an FRC intermediate mode, etc., is to be used by a downstream device and/or a display device operating in conjunction with the downstream device for a given set of images.

In some embodiments, the motion characteristics metadata includes an FRC flag for each image to indicate the best FRC operational mode for the image. In various embodiments, a downstream device may implement an algorithm to set FRC operational modes per image, per scene, per GOP, per fixed number of images, etc. For example, the downstream device may set a particular FRC operational mode for a set of images in response to determining that a plurality of images (e.g., exceeding a certain threshold number, etc.) in the set of images has the particular FRC operational mode predetermined (e.g., through a per-image flag, etc.) at the encoder side as the best FRC operational mode.

In some embodiments, the motion characteristics metadata includes an FRC flag (e.g., the single-valued FRC flag, etc.) for each set of images (e.g., representing a scene, etc.) to indicate the best FRC operational mode for the set of images. The downstream device may set a particular FRC operational mode for the set of images in response to determining that the set of images has the particular FRC operational mode predetermined (e.g., through a per-image flag, etc.) at the encoder side as the best FRC operational mode.

In some embodiments, the motion characteristics metadata may comprise an overall value/factor or multiple component values/factors (e.g., the multi-valued FRC flag, etc.) per image, per scene, per GOP, etc. Some or all of the motion characteristics metadata may be carried in one or more tables. For example, the motion characteristics metadata may comprise a FRC data field or flag per image, per scene, per GOP, etc., to indicate one or more of: a random motion type, a smooth motion type, a panning motion type (which is considered as a smooth motion type), a random translational motion type, a smooth translational motion type, a random rotational motion type, a smooth rotational motion type, etc.

In some embodiments, instead of or in addition to generating the motion characteristics metadata that explicitly determines/sets the best FRC operational modes, the upstream device may generate one or more portions of the motion characteristics metadata that can be used to guide downstream devices to select the best FRC operational mode among various FRC operational modes respectively implemented by different downstream devices. For example, the motion characteristics metadata may be used to indicate that there are primarily translational motions in an image or a spatial region thereof, in a scene, etc. Additionally, optionally, or alternatively, the motion characteristics metadata may be used to indicate that there are two or more layer or spatial regions of different types of motions in an image or a spatial region thereof, in a scene, etc. For example, the two or more layers of different types of motions may include a first layer or a first spatial region of rains (or raining motions), a second layer or a second spatial region of (e.g., relatively static, relatively stationary, etc.) background, etc. The motion characteristics metadata may be used by a downstream device to guide its own selection of the best FRC operational mode among a plurality FRC operational modes implemented by the downstream device or a display device operating in conjunction with the downstream device in an image or a spatial region thereof, in a scene, etc.

The motion characteristics metadata can be generated in real time, in offline processing, time-delay processing, etc. The motion characteristics metadata may be included by (e.g., as a part of, as supplemental metadata to, etc.) overall image metadata embedded (e.g., as sub-bitstreams, as one or more data fields, as one or more flags, etc.) in one or more media data bitstreams that are used to transmit the images to the downstream devices.

In some embodiments, some or all of the motion characteristics metadata may be generated based at least in part on the knowledge of future images relative to one or more currently decoded, processed and/or designated images, where the future images are available, for example, as a part of a non-live media program, as a part of offline processing of a media program, in a peek-ahead buffer of a live or non-live media program, etc.

In some embodiments, a downstream device (e.g., a set-top box, a TV, a mobile device, a tablet computer, a laptop computer, a PC, etc.) may receive the image sequence comprising the sets of images in the media program with the motion characteristics metadata generated by the upstream device.

For example, in a decoding/playback stage (e.g., in a television, in a set-top box, etc.), the downstream device read or decode the complexity of motion (for the image sequence) from the motion characteristics metadata that is encoded and carried in one or more media data bitstreams from which the sets of images can be decoded. Based at least in part on the decoded complexity of motion, the downstream device can decide on the best FRC operational mode (or the best FRC settings). In some embodiments, the downstream device can decide on the best FRC operational mode (or the best FRC settings) further based on FRC capabilities of the downstream device and/or a display device operating in conjunction with the downstream device. For example, the downstream device and/or the display device may have relatively strong FRC capabilities in interpolating translational motions, but relatively weak FRC capabilities in interpolating rotational motions. In response to determining that the complexity of motion indicates relatively predominant translational motions in an image, in a scene, etc., the downstream device and/or the display device may set a FRC HIGH or FRC MED as the best FRC operational mode for the image, for the scene, etc. On the other hand, in response to determining that the complexity of motion indicates relatively predominant rotational motions in an image, in a scene, etc., the downstream device and/or the display device may set a FRC LOW or even FRC OFF as the best FRC operational mode for the image, for the scene, etc.

In some embodiments, the downstream device may be freed from performing some or all of the operations used to classify the sets of images in the media program after receiving the images directly or indirectly from the upstream device. Some or all of optical flow fields, cluster maps with and/or without morphological operations, number of objects directly or indirectly detected from the optical flow fields, histograms and/or distributions of motion vectors, histograms and/or distributions of characteristics (e.g., standard deviations, kurtoses, skews, etc.) of motion vectors, optimal FRC operational modes determined by one or more classifying processes or classifiers, etc., can be derived at the decoder side (e.g., by the downstream device) from the motion characteristics metadata. In some embodiments, some or all of the motion characteristics metadata may be used to determine or select a respective (optimal) FRC operational mode for each of the sets of images.

Using the motion characteristics metadata generated at the encoder side, the downstream device can avoid or reduce buffering the images and analyzing motion statistics of the images at the decoder side, thereby significantly avoiding or reducing delays in rendering the images. Motion characteristics metadata can be used in a flexible manner in various embodiments. For example, in some embodiments, the motion characteristics metadata including but not limited to the size/amount of metadata overheads may be specifically optimized for deploying to one or more of: particular FRC related frameworks, particular platforms, particular manufacturers/vendors, particular types of display devices and/or computing devices, etc. In some other embodiments, the motion characteristics metadata including but not limited to the size/amount of metadata overheads may be based on standards, proprietary specifications, enhancements to standards and/or proprietary specifications, etc., and may be deployed to a wide variety of FRC related frameworks, platforms, manufacturers/vendors, types of display devices and/or computing devices, etc.

Additionally, optionally, or alternatively, a downstream device may be configured to perform adaptive operations to adapt the motion characteristics metadata for optimally selecting/determining optimal FRC operational modes (or optimal FRC settings) for images to be rendered with the downstream device. For example, the motion characteristics metadata may include one or more metadata portions that specify, or that can be used to determine, a set of more or fewer FRC operational modes than device-specific FRC operational modes actually implemented with the downstream device or with a display device operating in conjunction with the downstream device. The downstream device and/or the display device may be configured to map the FRC operational modes in the set that can be specified/determined based on the motion characteristics metadata to the device-specific FRC operational modes.

In some embodiments, the motion characteristics metadata may include one or more metadata portions that specify, or that can be used to determine, multiple sets of FRC operational modes and/or multiple sets of FRC operational parameters. Each of the multiple sets of FRC operational modes and/or the multiple sets of FRC operational parameters may be applicable to one or more of: respective FRC related frameworks, respective platforms, respective manufacturers/vendors, particular types of display devices and/or computing devices, etc. The downstream device or with a display device operating in conjunction with the downstream device may be configured to select a particular set of FRC operational modes from the multiple sets of FRC operational modes and/or a particular set of FRC operational parameters from the multiple sets of FRC operational parameters that is appropriate to the downstream device and/or the display device, for example, based on FRC capabilities of the downstream device and/or the display device.

In some embodiments, different FRC operational modes may be selected or determined for different spatial regions of images. A spatial region as described herein may refer to a set of contiguous pixels in (e.g., a frame of, etc.) an image. For example, a display system as described herein may be configured to partition/segment an image (or two or more adjacent images) into one or more spatial regions based on respective motion characteristics in the one or more spatial regions of the image (or the two or more adjacent images). In some embodiments, the one or more spatial regions collectively span an entire image. In some embodiments, none of the one or more spatial regions may be non-overlapping. In some embodiments, at least two of the one or more spatial regions may overlap with each other.

The different motion characteristics in the different spatial regions may be determined with an optical flow field or motion vectors therein as generated from two or more adjacent images including but not necessarily limited to the (current) image. In an example, relatively high motions may be detected in a first portion of the image, whereas relatively low motions may be detected in a second portion of the image. In another example, relatively random motions may be detected in a third portion of the image, whereas relatively smooth motions may be detected in a fourth portion of the image. In yet another example, relatively predominant rotational motions may be detected in a third portion of the image, whereas relatively predominantly translational motions may be detected in a fourth portion of the image.

Additionally, optionally, or alternatively, the different motion characteristics in the different spatial regions may be determined with a cluster map derived from the optical flow field. For example, mapped values in the cluster map with or without morphological operations may be used to partition/segment the image (or the two or more images) into the different spatial regions.

In some embodiments, techniques as described herein may be applied at a spatial region level. For example, one or both of the processes of FIG. 1A and FIG. 1B may be performed at the spatial region level. An individual optimal FRC operational mode (or FRC settings) may be specifically selected or determined for an individual spatial region of the different spatial regions. Thus, in some embodiments, instead of applying a single FRC operational mode (or FRC settings), multiple different FRC operational modes may be selected or determined for an image or different spatial regions therein.

For the purpose of illustration only, it has been described that some or all of the number of objects, the relationship between the variance of the magnitude components with respect to certain magnitude variance threshold, the relationship between the variance of the direction components with respect to certain direction variance threshold, the relationship between the second peak of a histogram (e.g., a magnitude component histogram, a direction component histogram, a standard deviation histogram, a higher moment histogram such as kurtosis or skew histogram, etc.) with respect to the first peak of the same histogram, etc., may be used to determine or classify one or more images as containing relatively random motions, as containing relatively smooth motions, etc. Additionally, optionally, or alternatively, types of motions such as random translations, random rotations, smooth translations, smooth rotations, panning motions, a combination of two or more different types of motions in images or spatial regions therein can be determined based on some or all of these parameters relating to motion characteristics in the images or the spatial regions therein.

It should be noted that in various embodiments, in addition to, or in place of, these parameters, other parameters relating to motion characteristics in the images or the spatial regions therein may be used. For example, parameters such as the number of cluster, the relationship between the first peak with respect to the entire histogram (e.g., the entire magnitude component histogram, the entire direction component histogram, the entire standard deviation histogram, the entire higher moment histogram such as the entire kurtosis or skew histogram, etc.), the relationship between the first two or more peaks with respect to the entire histogram, etc., may be used to determine or classify the one or more images as containing relatively random motions, as containing relatively smooth motions, etc. Additionally, optionally, or alternatively, types of motions such as random translations, random rotations, smooth translations, smooth rotations, panning motions, a combination of two or more different types of motions in images or spatial regions therein can be determined based at least in part on some or all of these additional parameters relating to motion characteristics in the images or the spatial regions therein.

In some embodiments, non-motion characteristics metadata can be generated by upstream devices (e.g., video encoding devices, etc.) to guide operations in downstream devices (e.g., video decoding devices, etc.). By way of example but not limitation, noise level metadata can be generated by upstream devices to indicate a level of noise in an image or a spatial region thereof, in a scene, etc., in order to guide application of sharpening filters, a noise reduction filters, etc., implemented in downstream devices or display devices operating in conjunction with the downstream devices. For images or spatial regions therein that are sensitive to visual artifacts (e.g., halos, noises, etc.) caused by applying a sharpening filter, a noise reduction filter, etc., noise level metadata can be generated by an upstream device and used by downstream devices to avoid the application or reduce the strength of the sharpening filter, the noise reduction filter, etc., for the purpose of avoiding or reducing these visual artifacts in images that are prone to generating these visual artifacts if the application or the strength (e.g., set by a user, set by default, set programmatically, set without the benefit of the noise level metadata, etc.) of the sharpening filter, the noise reduction filter, etc., were maintained or applied.

For example, in a pre-computing stage (e.g., offline, during encoding, before encoding, etc.), the upstream device may determine noise levels in the image sequence and generate noise level metadata for the image sequence based on the noise levels determined in the image sequence.

The noise level metadata can be generated in real time, in offline processing, time-delay processing, etc. The noise level metadata may be included by (e.g., as a part of, as supplemental metadata to, etc.) overall image metadata embedded (e.g., as sub-bitstreams, as one or more data fields, as one or more flags, etc.) in one or more media data bitstreams that are used to transmit the images to the downstream devices.

In some embodiments, a downstream device (e.g., a set-top box, a TV, a mobile device, a tablet computer, a laptop computer, a PC, etc.) may receive the image sequence comprising the sets of images in the media program with the noise level metadata generated by the upstream device.

In some embodiments, the downstream device may be freed from performing some or all of the operations used to determine the noise levels in the sets of images in the media program after receiving the images directly or indirectly from the upstream device.

For example, in a decoding/playback stage (e.g., in a television, in a set-top box, etc.), the downstream device read or decode the noise levels (for the image sequence) from the noise level metadata that is encoded and carried in one or more media data bitstreams from which the sets of images can be decoded. Based at least in part on the decoded noise levels, the downstream device can decide on whether a sharpening filter, a noise reduction filter, etc., is to be applied or how much the strength of such filtering is to be applied. In response to determining that the noise levels for one or more images indicate the sharpening filter, the noise reduction filter, etc., should not be applied, the downstream device and/or the display device may turn off the sharpening filter, the noise reduction filter, etc., for these images. On the other hand, in response to determining that the noise levels for one or more images indicate the sharpening filter, the noise reduction filter, etc., should not be applied, the downstream device and/or the display device may turn on the sharpening filter, the noise reduction filter, etc., for these images. Additionally, optionally, or alternatively, the downstream device and/or the display device may further determines a strength of the sharpening filter, the noise reduction filter, etc., to be applied to these images based on the noise level metadata.

In some embodiments, different sharpening operations/filters, different noise reduction operations/filters, different strengths of sharpening operations/filters, different strengths of noise reduction operations/filters, etc., can be applied to different spatial regions of images. For example, a display system as described herein may be configured to partition/segment an image (or two or more adjacent images) into one or more spatial regions based on respective noise levels in the one or more spatial regions of the image (or the two or more adjacent images). In some embodiments, the one or more spatial regions collectively span an entire image. In some embodiments, none of the one or more spatial regions may be non-overlapping. In some embodiments, at least two of the one or more spatial regions may overlap with each other. Thus, in some embodiments, sharpening and/or noise reduction techniques as described herein may be applied at a spatial region level.

In some embodiments, techniques as described herein may be used to indicate sensitivity levels for image enhancement operation (e.g., color enhancement, saturation boosting, etc.) in an image or a spatial region thereof, in a scene, etc., in order to guide application of the image enhancement operations implemented in downstream devices or display devices operating in conjunction with the downstream devices.

For images or spatial regions therein that are sensitive to visual artifacts (e.g., unnatural skin color tone, etc.) caused by applying any given image enhancement operation, enhancement sensitivity metadata can be generated by an upstream device and used by downstream devices to avoid the application or reduce the strength of the image enhancement operation for the purpose of avoiding or reducing these visual artifacts in images that are prone to generating these visual artifacts if the application or the strength (e.g., set by a user, set by default, set programmatically, set without the benefit of the enhancement sensitivity metadata, etc.) of the image enhancement operation were maintained or applied.

For example, in a pre-computing stage (e.g., offline, during encoding, before encoding, etc.), the upstream device may determine sensitivity levels for image enhancement operations in the image sequence and generate enhancement sensitivity metadata for the image sequence based on the sensitivity levels determined in the image sequence. The enhancement sensitivity metadata may indicate a relatively high sensitivity for saturation boosting because of a presence of sensitive skin tones in an image or a portion thereof. If there are sensitive skin tones, then the downstream device can turn off the application or reduce the strength of color enhancement algorithms performed in the downstream device or in a display device operating in conjunction with the downstream device.

The enhancement sensitivity metadata can be generated in real time, in offline processing, time-delay processing, etc. The sensitivity level metadata may be included by (e.g., as a part of, as supplemental metadata to, etc.) overall image metadata embedded (e.g., as sub-bitstreams, as one or more data fields, as one or more flags, etc.) in one or more media data bitstreams that are used to transmit the images to the downstream devices.

In some embodiments, a downstream device (e.g., a set-top box, a TV, a mobile device, a tablet computer, a laptop computer, a PC, etc.) may receive the image sequence comprising the sets of images in the media program with the enhancement sensitivity metadata generated by the upstream device.

In some embodiments, the downstream device may be freed from performing some or all of the operations used to determine the sensitivity levels for image enhancement operations in the sets of images in the media program after receiving the images directly or indirectly from the upstream device.

For example, in a decoding/playback stage (e.g., in a television, in a set-top box, etc.), the downstream device read or decode the sensitivity levels (for the image sequence) for image enhancement operations from the enhancement sensitivity metadata that is encoded and carried in one or more media data bitstreams from which the sets of images can be decoded. Based at least in part on the decoded sensitivity levels, the downstream device can decide on whether some or all of the image enhancement operations should be applied or how much the strength of the image enhancement operations is to be applied. In response to determining that a sensitivity level for a given image enhancement operation in one or more images indicate the image enhancement operation should not be applied, the downstream device and/or the display device may turn off the image enhancement operation for these images. On the other hand, in response to determining that the sensitivity level for the image enhancement operation in the one or more images indicates the image enhancement operation should be applied, the downstream device and/or the display device may turn on the image enhancement operation for these images. Additionally, optionally, or alternatively, the downstream device and/or the display device may further determines a strength of the image enhancement operation to be applied to these images based on the enhancement sensitivity metadata.

In some embodiments, different image enhancement operations, different strengths of same image enhancement operations, etc., can be applied to different spatial regions of images. For example, a display system as described herein may be configured to partition/segment an image (or two or more adjacent images) into one or more spatial regions based on respective sensitive levels for image enhancement operations in the one or more spatial regions of the image (or the two or more adjacent images). In some embodiments, the one or more spatial regions collectively span an entire image. In some embodiments, none of the one or more spatial regions may be non-overlapping. In some embodiments, at least two of the one or more spatial regions may overlap with each other. Thus, in some embodiments, image enhancement techniques as described herein may be applied at a spatial region level.

4. Example Video Encoders and Decoders

Figure 3A:
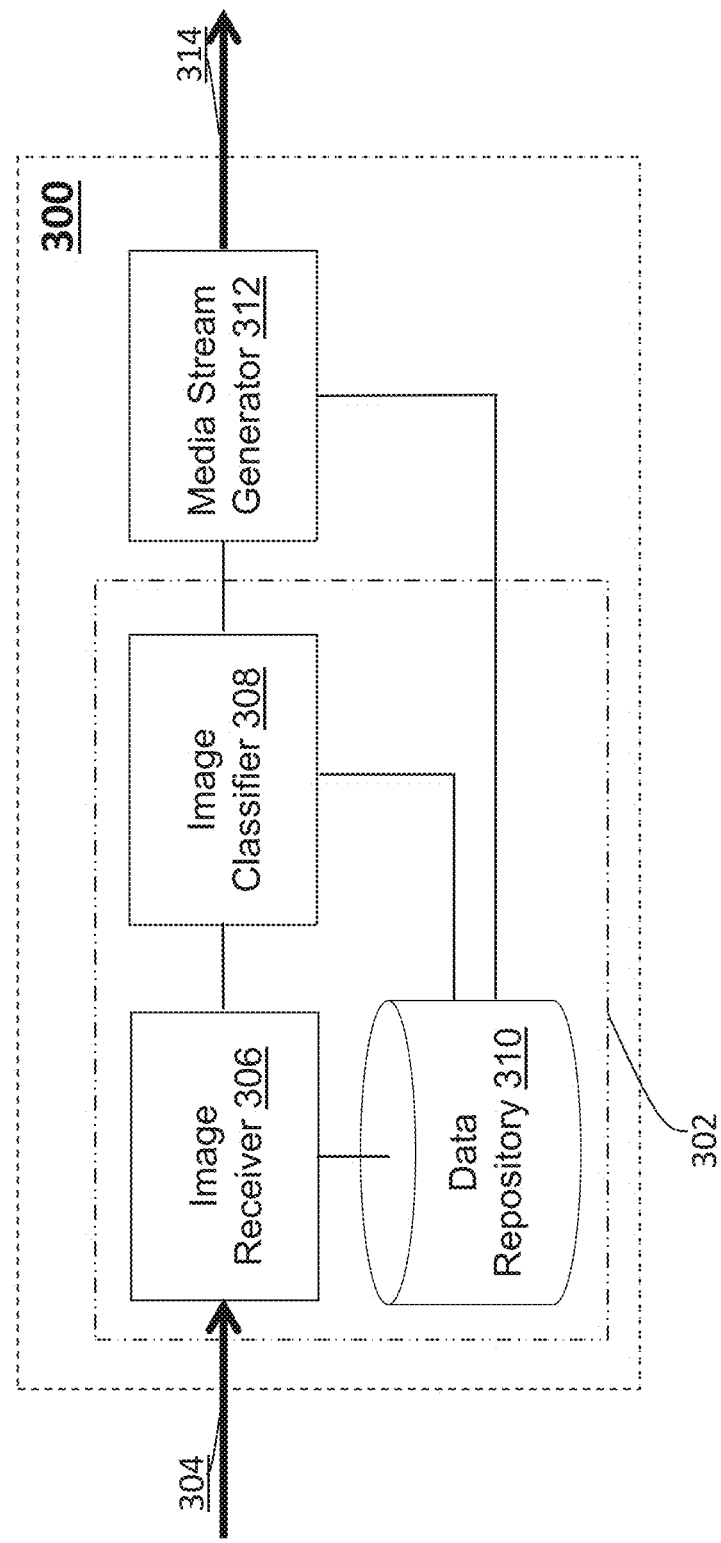
FIG. 3A-FIG. 3C illustrate example spherical video encoders and clients.

FIG. 3A illustrates an example video encoder 300 that comprises an image processor 302, a medium stream generator 312, etc. In some embodiments, the image processor (302) comprises an image receiver 306, an image classifier 308, a data repository 310, etc. Some or all of the components of the video encoder (300) may be implemented by one or more devices, modules, units, etc., in software, hardware, a combination of software and hardware, etc.

In some embodiments, the image receiver (306) comprises software, hardware, a combination of software and hardware, etc., configured to receive an image sequence 304 from an image source such as a cloud-based image source, a camera system in connection with a VR application, an AR application, a remote presence application, a display application, etc.; decode the image stream (304) into one or more sets of images (e.g., one or more scenes in a media program, a sequence of images, etc.); etc.

In some embodiments, the image classifier (308) comprises software, hardware, a combination of software and hardware, etc., configured to classify the images into different image types (e.g., FRC related image types, non-FRC related image types, etc.). The classification of the images into the different image types may be, but are not limited to only, image-based, Group-of-Picture (GOP)-based, scene-based, multiple-scene-based, etc.

Example image types may include, but are not necessarily limited to only, any of: images containing relatively random motions, images containing relatively smooth motions, images containing predominantly translational motions, images containing predominantly rotational motions, images containing panning motions, images that are relatively sensitive to one or more noise-related operations (e.g., sharpening filtering, noise reduction operations, etc.), images that are relatively insensitive to one or more noise-related operations, images that are relatively sensitive to one or more image enhancement operations (e.g., color enhancement operations, saturation boosting, etc.), images that are relatively insensitive to one or more image enhancement operations, etc.

In some embodiments, the different image types may be used by the image classifier (308) to generate image metadata such as motion characteristics metadata, noise level metadata, enhancement sensitivity metadata, etc.

Additionally, optionally, or alternatively, in some embodiments, the different image types may be determined based at least in part on input image metadata (e.g., input motion characteristics metadata, input noise level metadata, input enhancement sensitivity metadata, etc.) received with and decoded from the image stream (304). In some embodiments, image metadata as described herein may be generated by the video encoder (300) and/or an upstream system. In some embodiments, the upstream system may be an upstream spherical video encoder, which generates the image stream (304) and/or delivers the image stream (304) to the video encoder (300) through one or more network connections.

In some embodiments, image metadata as described herein may be generated by the video encoder (300) and/or the upstream system by performing image content analyses on the image stream (304). Such image content analyses may be performed using one or more of: optical flow analysis techniques, non-optical flow analysis techniques, motion analysis techniques, luminance/chroma based analysis techniques, any combination of one or more computer vision techniques such as Haar Filters, wavelet decomposition, Fourier space based spatial resolution tracking, etc.

In some embodiments, the data repository (310) represents one or more databases, one or more data storage units/modules/devices, etc., configured to support operations such as storing, updating, retrieving, deleting, etc., with respect to some or all of the images, image metadata such as motion characteristics metadata, noise level metadata, enhancement sensitivity metadata, etc.

In some embodiments, the medium stream generator (312) comprises software, hardware, a combination of software and hardware, etc., configured to generate a video stream encoded with an image sequence comprising images (which may or may not be identical to the images) derived from the images and further encoded with the image metadata comprising one or more of: motion characteristics metadata, noise level metadata, enhancement sensitivity metadata, etc.; provide/transmit the video stream via a data flow 314 directly or indirectly through intermediate devices, etc., to a set-top device, a video decoder, a display device, a storage device, etc.

For the purpose of illustration, it has been described that motion characteristics metadata can be generated by a video encoder and transmitted to a video decoder for selecting optimal FRC operational modes (e.g., FRC upscaling, FRC downscaling, etc.) for converting from a first image refresh rate of video content to a second different device-specific image refresh rate of an image rendering device. It should be noted that in various embodiments, motion characteristics metadata can also be already computed, for example by a codec in a video encoding device upstream to the video encoder. Instead of decoding video content and computing optical flow in the video content, the video encoder can analyze motion vectors already computed by the video encoding device and generate the motion characteristics metadata directly from the motion vectors. Additionally, optionally or alternatively, instead of or in addition to generating motion characteristics metadata by a video encoder from analyzing video content and/or from already computed motion vectors by a codec upstream to the video encoder, in various embodiments, some or all of motion characteristics metadata as described herein can also be generated from analyzing video content and/or from already computed motion vectors during encoding, decoding, transcoding, and/or even by an end user device such as a television or mobile device, etc. Thus, some or all of motion characteristics metadata as described herein may be generated in these and other image processing/rendering stages.

Additionally, optionally, or alternatively, some or all of image processing operations such as scene cut detections, display management, content mapping, color mapping, etc., may be performed by the video encoder (300).

The video encoder (300) may be used to support real time display applications, near-real-time display applications, non-real-time display applications, virtual reality, augmented reality, helmet mounted display applications, heads up display applications, games, 2D display applications, 3D display applications, multi-view display applications, etc. For example, some or all of images, output images, the image metadata, etc., are generated or accessed by the video encoder (300) in real time, in near real time, etc.

Figure 3B:
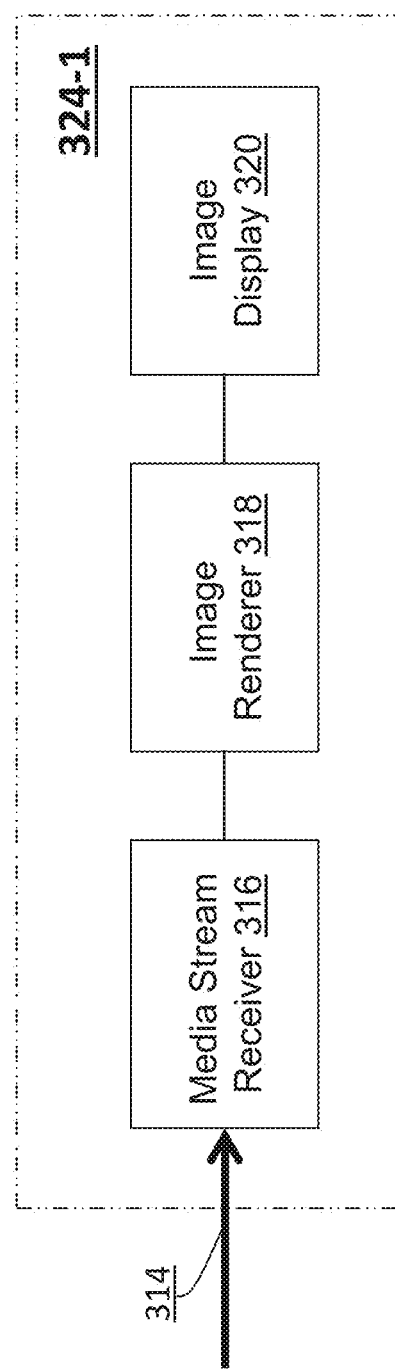

FIG. 3B illustrates an example video decoder 324-1 that comprises a media stream receiver 316, an image renderer 318, an image display 320, etc. Some or all of the components of the video decoder (324-1) may be implemented by one or more devices, modules, units, etc., in software, hardware, a combination of software and hardware, etc.

In some embodiments, the medium stream receiver (316) comprises software, hardware, a combination of software and hardware, etc., configured to receive the video stream encoded with the image sequence comprising the one or more sets of images in the media program and further encoded with the image metadata comprising one or more of: the motion characteristics metadata, the noise level metadata, the enhancement sensitivity metadata, etc., via the data flow (314).

In some embodiments, the image renderer (318) comprises software, hardware, a combination of software and hardware, etc., configured to decode images from the video stream; decode the motion characteristics metadata from the video stream; determining optimal FRC operational modes for the images; apply image replications and/or image interpolation to the decoded images based on the optimal FRC operational modes determined for the decoded images to generate additional images from the decoded images for the purpose of converting an input image refresh rate of the decoded images to a device-specific image refresh rate of the video decoder (324-1) or the image display (320); perform image processing operations on the decoded images and the additional images to be rendered on the image display (320), where the images are decoded from the video stream received by the video decoder (324-1); output processed images to the image display (320) for rendering; etc.

Example image processing operations performed by the image renderer (318) may include, but are not necessarily limited to, any of: image replications in an FRC OFF mode, image interpolations in an FRC HIGH mode, image interpolations in an FRC MED mode, image interpolations in an FRC LOW mode, image sharpening filtering, noise reduction operations, image enhancement operations, color enhancement operations, saturation boosting, etc.

For the purpose of illustration, it has been described that motion characteristics metadata can be transmitted to and used by a video decoder for selecting optimal FRC operational modes (e.g., FRC upscaling, etc.) for converting from a relatively low image refresh rate of video content to a relatively high device-specific image refresh rate of an image rendering device. It should be noted that in various embodiments, motion characteristics metadata can also be used by a video decoder for selecting optimal FRC operational modes (e.g., FRC downscaling, etc.) for converting from a relatively high image refresh rate of video content to a relatively low device-specific image refresh rate of an image rendering device. For example, in operational scenarios in which relatively smooth motions (including but not limited to relatively static or stationary scenes/images) are detected from two or more adjacent images, based on motion statistics indicating the relatively smooth motions, an FRC operational mode for performing relatively strong image combination may be predicted and/or selected. On the other hand, in operational scenarios in which relatively random motions are detected from two or more adjacent images, based on motion statistics indicating the relatively random motions, an FRC operational mode for performing relatively weak or no image combination may be predicted and/or selected. Thus, motion characteristics metadata as described herein may be used in these and other image processing operations.

Additionally, optionally, or alternatively, some or all of image processing/rendering operations such as display management, content mapping, tone mapping, color mapping, prediction, etc., may be performed by the video decoder (324-1).

The video decoder (324-1) may be used to support real time display applications, near-real-time display applications, non-real-time display applications, virtual reality, augmented reality, helmet mounted display applications, heads up display applications, games, 2D display applications, 3D display applications, multi-view display applications, etc. For example, some or all of images, image metadata, etc., are generated or accessed by the video decoder (324-1) in real time, in near real time, etc.

Techniques as described herein can be implemented in a variety of system architectures. Some or all image processing operations as described herein can be implemented by one or more of cloud-based video encoders, video encoders collocated with or incorporated into video decoders, video decoders, video decoders, display devices, etc. Based on one or more factors such as types of display applications, bandwidth/bitrate budgets, computing capabilities, resources, loads, etc., of recipient devices, computing capabilities, resources, loads, etc., of video encoders and/or computer networks, etc., some image analyzing/processing/rendering operations can be performed by a video encoder, while some other image analyzing/processing/rendering operations can be performed by a video decoder, an video decoder, a display device, etc.

Figure 3C:
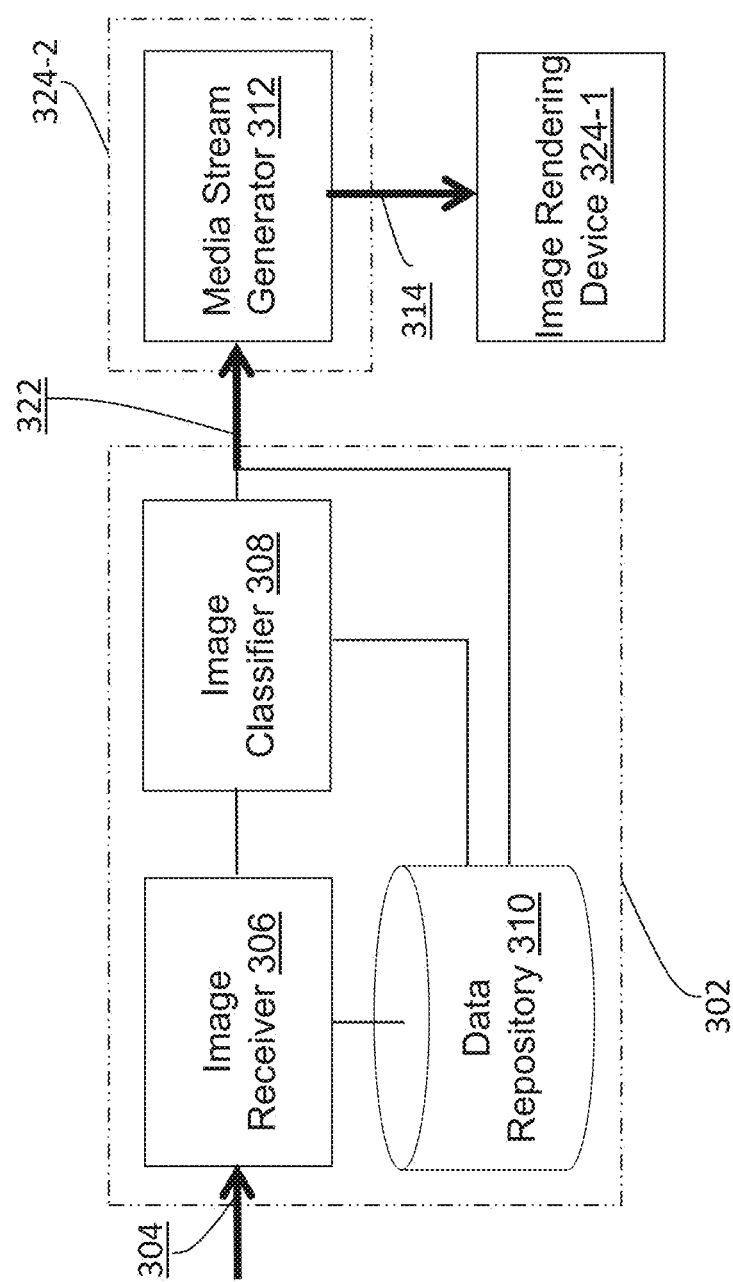

FIG. 3C illustrates an example configuration in which a media stream generator (e.g., 312, etc.) is incorporated into an edge video encoder 324-2. In some embodiments, an image processor 302 of FIG. 3C may be cloud-based. In some embodiments, the image processor (302) may be located in a core network separate from edge devices such as the edge video encoder (324-2). As in FIG. 3A, the image processor (302) may comprise an image receiver 306, an image classifier 308, a data repository 310, etc. The image processor (302) may represent an upstream video encoder that communicates with the edge video encoder (324-2) over one or more network connections in one or more of a wide variety of relatively high bitrates to relatively low bitrates. Some or all of the components of the image processor (302) and/or the edge video encoder (324-2) may be implemented by one or more devices, modules, units, etc., in software, hardware, a combination of software and hardware, etc.

In some embodiments, the image processor (302) is configured to output images (e.g., images, etc.) and image metadata in a data flow 322 to downstream devices one of which may be the edge video encoder (324-2).

In some embodiments, the edge video encoder (324-2), or the medium stream generator (312) therein, comprises software, hardware, a combination of software and hardware, etc., configured to generate a video stream encoded with an image sequence comprising images (which may or may not be identical to the images) derived from the images and further encoded with the image metadata comprising one or more of: motion characteristics metadata, noise level metadata, enhancement sensitivity metadata, etc.; provide/transmit the video stream via the data flow (314) directly or indirectly through intermediate devices, etc., to a set-top device, a video decoder, a display device, a storage device, etc.

In some embodiments, a video decoder (e.g., 324-1), or an image renderer (e.g., 318 of FIG. 3B) therein, comprises software, hardware, a combination of software and hardware, etc., configured to perform image rendering/processing operations on images to be rendered on the image display (320), where the images are decoded from the video stream received by the video decoder (324-1); output processed images to the image display (320) for rendering; etc.

5. Example Process Flows

Figure 4A:
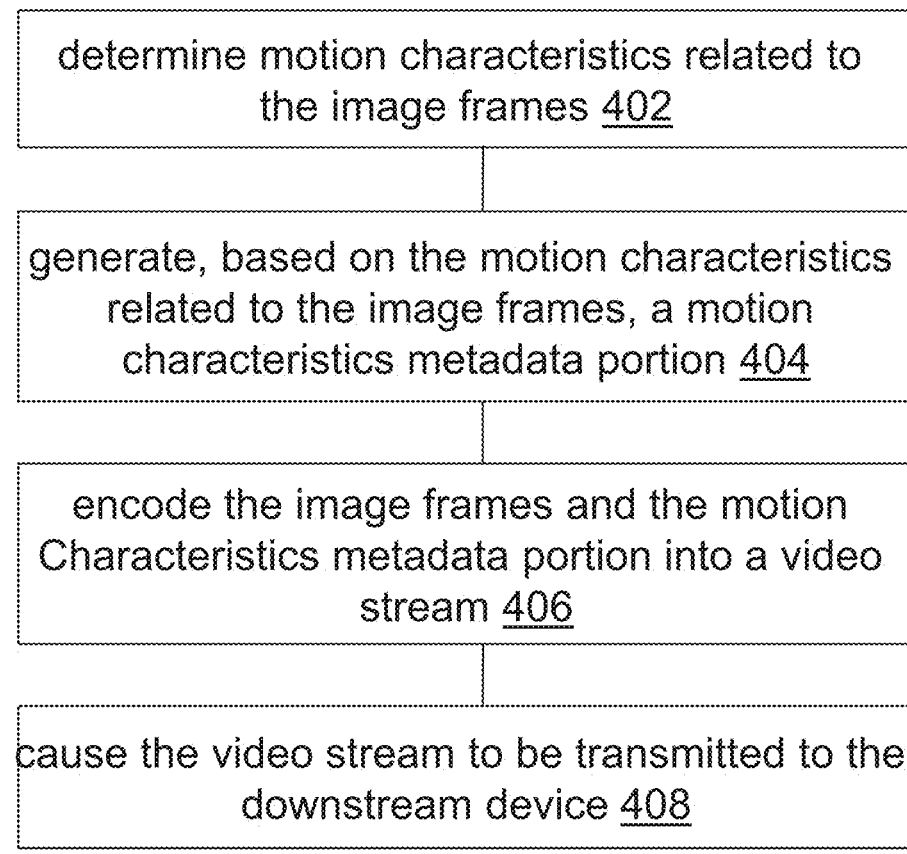
FIG. 4A and FIG. 4B illustrate example process flows.

FIG. 4A illustrates an example process flow according to an example embodiment of the present invention. In some example embodiments, one or more computing devices or components may perform this process flow. In block 402, a video encoder (e.g., a video encoder of FIG. 3A or FIG. 3B, etc.) determines one or more motion characteristics related to the one or more images.

In block 404, the video encoder generates, based at least in part on the one or more motion characteristics related to the one or more images, a motion characteristics metadata portion. The motion characteristics metadata portion is to be used for determining an optimal FRC operational mode with a downstream device for the one or more images.

In block 406, the video encoder encodes the one or more images into a video stream. The motion characteristics metadata portion is encoded into the video stream as a part of image metadata.

In block 408, the video encoder causes the video stream to be transmitted to the downstream device.

In an embodiment, the one or more motion characteristics comprise a motion characteristics determined using one or more motion estimation operations that are not related to optical flow.

In an embodiment, the one or more motion characteristics comprise a motion characteristics determined using one or more motion estimation operations that are related to optical flow. The one or more motion estimation operations related to optical flow comprise one or more of: operations generating one or more optical flows based on image content visually depicted in the one or more images, operations generating one or more cluster maps from one or more optical flows, morphological operations performed on one or more of optical flows, morphological operations performed on one or more cluster maps derived from one or more optical flows, etc.

In an embodiment, the one or more motion characteristics comprise a motion characteristics determined using one or more motion estimation operations that are one or more of: pixel-based motion estimation operations, pixel-block-based motion estimation operations, scene-based motion estimation operations, etc.

In an embodiment, the one or more images comprises a current image and one or more reference images other than the current image. The one or more reference images comprise one of: only a set of one or more images timewise preceding the current image, only a set of one or more images timewise succeeding the current image, or a combination of one or more images timewise preceding the current image and one or more images timewise succeeding the current image.

In an embodiment, the video encoder is further configured to perform: counting a total number of objects depicted in the one or more images; determining whether the total number of objects exceeds a component number threshold; in response to determining that the total number of objects does not exceed a component number threshold, generating the motion characteristics metadata portion for the one or more images to indicate avoiding generating additional images using image interpolation of the one or more images in the optimal FRC operational mode; etc.

In an embodiment, the one or more motion characteristics comprise one or more of: histograms of components of motion vectors, standard deviations of components of motion vectors, kurtoses of components of motion vectors, skews of components of motion vectors, etc.

In an embodiment, the video encoder is further configured to perform: comparing at least one motion characteristic in the one or more motion characteristics of the one or more images with a variance threshold; based on results of comparing the at least one motion characteristic with the variance threshold, determining whether the image content visually depicted in the one or more images comprises relatively random motions; etc.

In an embodiment, the video encoder is further configured to perform: determining one or more relationships between one or more peaks of a histogram of components of motion vectors represented in the one or more motion characteristics of the one or more images and one or more other portions of the histogram; based on the one or more relationships, determining whether the image content visually depicted in the one or more images comprises relatively random motions; etc.

In an embodiment, the one or more images belong to a set of images that represent a scene; the optimal FRC operational mode applies to all images in the set of images that represent the scene.

In an embodiment, the video stream is encoded with an image sequence representing a first time sequence of images that include the one or more images; the first time sequence of images supports a first image refresh rate in normal playing of the time sequence of images; the downstream device supports a second different image refresh rate in normal playing; the downstream device is to operate the optimal FRC operational mode to generate, based on the one or more images decoded from the video stream, additional images for complying with the second image refresh rate.

In an embodiment, the one or more images comprise a plurality of spatial regions; the plurality of spatial regions respectively corresponds to a plurality of sets of motion characteristics; each spatial region in the plurality of spatial regions corresponds to a respective set of motion characteristics; the optimal FRC operational mode represents a FRC operational mode optimally selected from a plurality of FRC operational modes for a specific spatial region in the plurality of spatial regions of the one or more images; the motion characteristics metadata portion is to be used to determine a second optimal FRC operational mode with the downstream device that represents a second different FRC operational mode optimally selected from the plurality of FRC operational modes for a second specific spatial region in the plurality of spatial regions of the one or more images.

In an embodiment, the plurality of FRC operational modes comprises two or more FRC operational modes indicating different levels of image interpolation.

In an embodiment, the plurality of FRC operational modes comprises two or more FRC operational modes indicating different levels of image combination.

In an embodiment, at least one of the one or more motion characteristics related to the one or more images is determined based on image content visually depicted in one or more images.

In an embodiment, at least one of the one or more motion characteristics related to the one or more images is determined based on motion vectors in one or more images; the motion vectors are already pre-computed by an upstream device.

In an embodiment, the motion characteristics metadata portion comprises one or more of: a single value representing an overall motion complexity related to the one or more images, a plurality of values representing a multi-dimensional complexity related to the one or more images, etc.

Figure 4B:
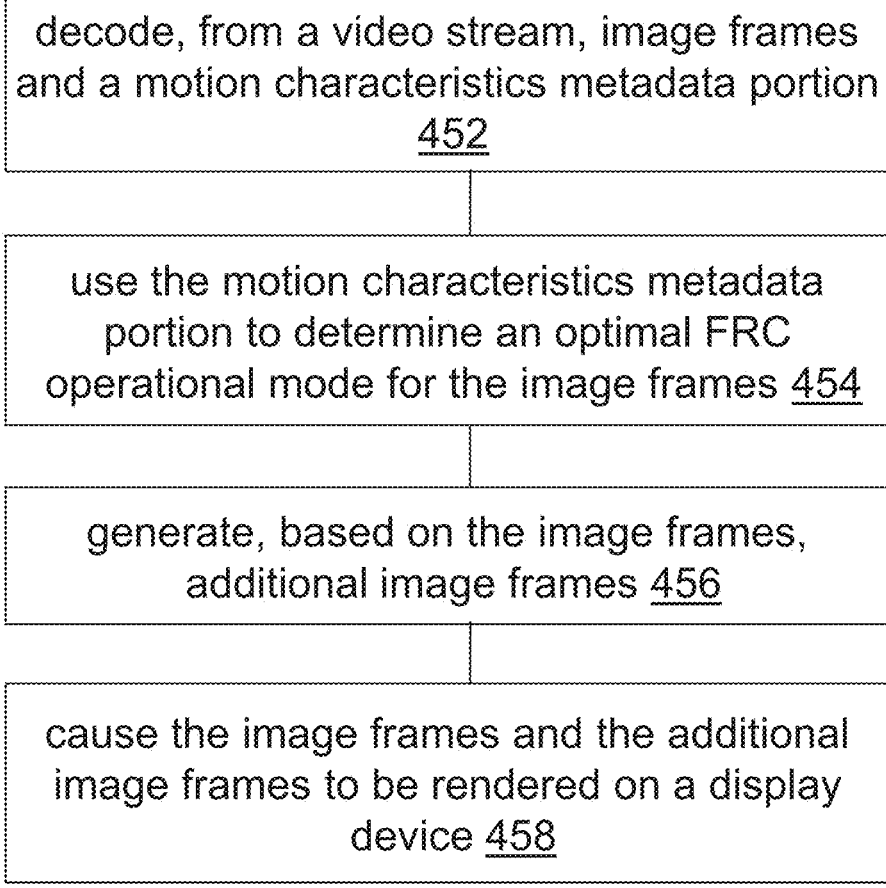

FIG. 4B illustrates an example process flow according to an example embodiment of the present invention. In some example embodiments, one or more computing devices or components may perform this process flow. In block 452, a video decoder (e.g., a video decoder of FIG. 3A through FIG. 3C, etc.) decodes, from a video stream, one or more images and a motion characteristics metadata portion. The motion characteristics metadata portion is generated by an upstream device for the one or more images based at least in part on one or more motion characteristics related to the one or more images. The one or more motion characteristics are determined based on image content visually depicted in one or more images.

In block 454, the video decoder uses the motion characteristics metadata portion to determine an optimal FRC operational mode for the one or more images.

In block 456, the video decoder operates the optimal FRC operational mode to generate, based on the one or more images, one or more additional images in addition to the one or more images.

In block 458, the video decoder causes the one or more images and the one or more additional images to be rendered on a display device.

In an embodiment, the motion characteristics metadata portion comprises one or more of: a single value representing an overall motion complexity related to the one or more images, a plurality of values representing a multi-dimensional complexity related to the one or more images, etc.

In an embodiment, the optimal FRC operational mode represents a specific FRC operational mode selected from a plurality of FRC operational modes for the one or more images.

In an embodiment, the plurality of FRC operational modes comprises two or more FRC operational modes indicating different levels of image interpolation.

In an embodiment, the plurality of FRC operational modes comprises two or more FRC operational modes indicating different levels of image combination.

In an embodiment, the motion characteristics metadata portion for the one or more images indicates avoiding generating the one or more additional images using image interpolation of the one or more images in the optimal FRC operational mode.

In an embodiment, the motion characteristics metadata portion for the one or more images indicates generating the one or more additional images using image interpolation of the one or more images in the optimal FRC operational mode.

In an embodiment, the video decoder is further configured to change to a different FRC operational mode at a scene cut separating two adjacent scenes.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

6. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
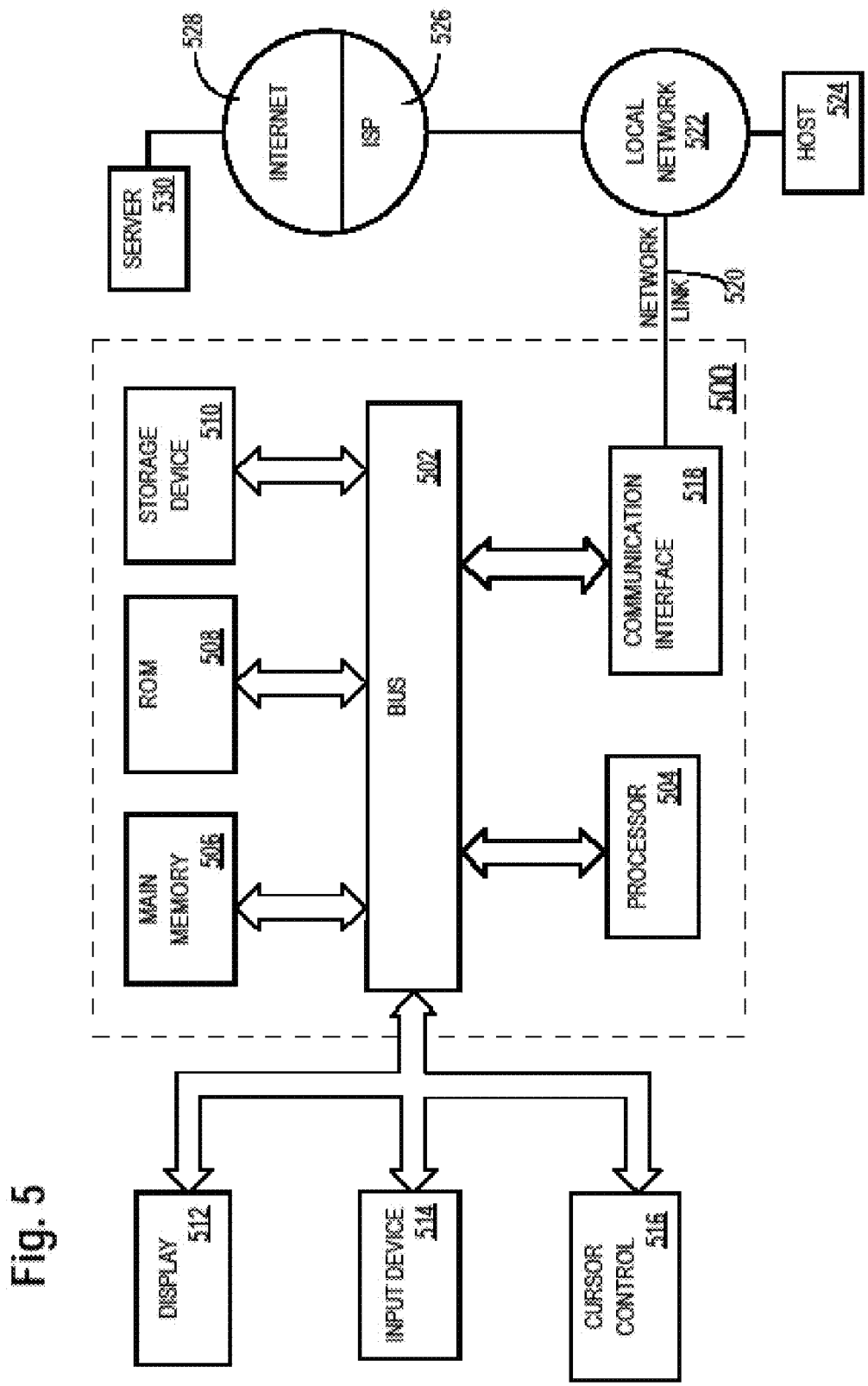
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs)

EEE 1. A method, comprising:
  determining one or more motion characteristics related to the one or more images;
  generating, based at least in part on the one or more motion characteristics related to the one or more images, a motion characteristics metadata portion, wherein the motion characteristics metadata portion is to be used for determining an optimal frame rate conversion (FRC) operational mode with a downstream device for the one or more images;

encoding the one or more images into a video stream, wherein the motion characteristics metadata portion is encoded into the video stream as a part of image metadata;

causing the video stream to be transmitted to the downstream device.

EEE 2. The method of EEE 1, wherein the one or more motion characteristics comprise a motion characteristic determined using one or more motion estimation operations that are not related to optical flow.

EEE 3. The method of EEE 1, wherein the one or more motion characteristics comprise a motion characteristic determined using one or more motion estimation operations that are related to optical flow.

EEE 4. The method of EEE 3, wherein the one or more motion estimation operations related to optical flow comprise one or more of: operations generating one or more optical flows based on image content visually depicted in the one or more images, operations generating one or more cluster maps from one or more optical flows, morphological operations performed on one or more of optical flows, or morphological operations performed on one or more cluster maps derived from one or more optical flows.

EEE 5. The method of EEE 1, wherein the one or more motion characteristics comprise a motion characteristic determined using one or more motion estimation operations that are one or more of: pixel-based motion estimation operations, pixel-block-based motion estimation operations, or scene-based motion estimation operations.

EEE 6. The method of EEE 1, wherein the one or more images comprises a current image and one or more reference images other than the current image.

EEE 7. The method of EEE 6, wherein the one or more reference images comprise one of: only a set of one or more images timewise preceding the current image, only a set of one or more images timewise succeeding the current image, or a combination of one or more images timewise preceding the current image and one or more images timewise succeeding the current image.

EEE 8. The method of EEE 1, further comprising:
counting a total number of objects depicted in the one or more images;
determining whether the total number of objects exceeds a component number threshold;
in response to determining that the total number of objects does not exceed a component number threshold, generating the motion characteristics metadata portion for the one or more images to indicate avoiding generating additional images using image interpolation of the one or more images in the optimal FRC operational mode.

EEE 9. The method of EEE 1, wherein the one or more motion characteristics comprise one or more of: histograms of components of motion vectors, standard deviations of components of motion vectors, kurtoses of components of motion vectors, or skews of components of motion vectors.

EEE 10. The method of EEE 1, further comprising:
comparing at least one motion characteristic in the one or more motion characteristics of the one or more images with a variance threshold;
based on results of comparing the at least one motion characteristic with the variance threshold, determining whether image content visually depicted in the one or more images comprises relatively random motions.

EEE 11. The method of EEE 1, further comprising:
determining one or more relationships between one or more peaks of a histogram of components of motion vectors represented in the one or more motion characteristics of the one or more images and one or more other portions of the histogram;
based on the one or more relationships, determining whether image content visually depicted in the one or more images comprises relatively random motions.

EEE 12. The method of EEE 1, wherein the one or more images belong to a set of images that represent a scene; and wherein the optimal FRC operational mode applies to all images in the set of images that represent the scene.

EEE 13. The method of EEE 1, wherein the video stream is encoded with an image sequence representing a first time sequence of images that include the one or more images; wherein the first time sequence of images supports a first image refresh rate in normal playing of the time sequence of images; wherein the downstream device supports a second different image refresh rate in normal playing; and wherein the downstream device is to operate the optimal FRC operational mode to generate, based on the one or more images decoded from the video stream, additional images for complying with the second image refresh rate.

EEE 14. The method of EEE 1, wherein the one or more images comprise a plurality of spatial regions; wherein the plurality of spatial regions respectively corresponds to a plurality of sets of motion characteristics; wherein each spatial region in the plurality of spatial regions corresponds to a respective set of motion characteristics; wherein the optimal FRC operational mode represents a FRC operational mode optimally selected from a plurality of FRC operational modes for a specific spatial region in the plurality of spatial regions of the one or more images; and wherein the motion characteristics metadata portion is to be used to determine a second optimal FRC operational mode with the downstream device that represents a second different FRC operational mode optimally selected from the plurality of FRC operational modes for a second specific spatial region in the plurality of spatial regions of the one or more images.

EEE 15. The method of EEE 14, wherein the plurality of FRC operational modes comprises two or more FRC operational modes indicating different levels of image interpolation.

EEE 16. The method of EEE 14, wherein the plurality of FRC operational modes comprises two or more FRC operational modes indicating different levels of image combination.

EEE 17. The method of EEE 1, wherein at least one of the one or more motion characteristics related to the one or more images is determined based on image content visually depicted in one or more images.

EEE 18. The method of EEE 1, wherein at least one of the one or more motion characteristics related to the one or more images is determined based on motion vectors in one or more images, and wherein the motion vectors are already pre-computed by an upstream device.

EEE 19. The method of EEE 1, wherein the motion characteristics metadata portion comprises one or more of: a single value representing an overall motion complexity related to the one or more images, or a plurality of values representing a multi-dimensional complexity related to the one or more images.

EEE 20. A method, comprising:
decoding, from a video stream, one or more images and a motion characteristics metadata portion, wherein the motion characteristics metadata portion is generated by an upstream device for the one or more images based at least in part on one or more motion characteristics related to the one or more images, wherein the one or more motion characteristics are determined based on image content visually depicted in one or more images;

using the motion characteristics metadata portion to determine an optimal frame rate conversion (FRC) operational mode for the one or more images;

operating the optimal FRC operational mode to generate, based on the one or more images, one or more additional images in addition to the one or more images;

causing the one or more images and the one or more additional images to be rendered on a display device.

EEE 21. The method of EEE 20, wherein the motion characteristics metadata portion comprises one or more of: a single value representing an overall motion complexity related to the one or more images, or a plurality of values representing a multi-dimensional complexity related to the one or more images.

EEE 22. The method of EEE 20, wherein the optimal FRC operational mode represents a specific FRC operational mode selected from a plurality of FRC operational modes for the one or more images.

EEE 23. The method of EEE 22, wherein the plurality of FRC operational modes comprises two or more FRC operational modes indicating different levels of image interpolation.

EEE 24. The method of EEE 22, wherein the plurality of FRC operational modes comprises two or more FRC operational modes indicating different levels of image combination.

EEE 25. The method of EEE 20, wherein the motion characteristics metadata portion for the one or more images indicates avoiding generating the one or more additional images using image interpolation of the one or more images in the optimal FRC operational mode.

EEE 26. The method of EEE 20, wherein the motion characteristics metadata portion for the one or more images indicates generating the one or more additional images using image interpolation of the one or more images in the optimal FRC operational mode.

EEE 27. The method of EEE 20, further comprising changing to a different FRC operational mode at a scene cut separating two adjacent scenes.

EEE 28. An apparatus performing any of the methods as recited in EEEs 1-27.

EEE 29. A system performing any of the methods as recited in EEEs 1-27.

EEE 30. A non-transitory computer readable storage medium, storing software instructions, which when executed by one or more processors cause performance of the method recited in any of EEEs 1-27.

EEE 31. A computing device comprising one or more processors and one or more storage media, storing a set of instructions, which when executed by one or more processors cause performance of the method recited in any of EEEs 1-27.

The invention claimed is:

1. A method, comprising:
   determining one or more motion characteristics related to the one or more images;
   generating, based at least in part on the one or more motion characteristics related to the one or more images, a motion characteristics metadata portion, wherein the motion characteristics metadata portion is to be used for determining an optimal frame rate conversion (FRC) operational mode with a downstream device for the one or more images;
   encoding the one or more images into a video stream, wherein the motion characteristics metadata portion is encoded into the video stream as a part of image metadata wherein the motion characteristics metadata portion encoded in the video stream indicates whether the one or more motion characteristics are of a random motion type;
   causing the video stream to be transmitted to the downstream device.

2. The method of claim 1, wherein the one or more images comprises a current image and one or more reference images other than the current image.

3. The method of claim 1, further comprising:
   counting a total number of objects depicted in the one or more images;
   determining whether the total number of objects exceeds a component number threshold;
   in response to determining that the total number of objects does not exceed a component number threshold, generating the motion characteristics metadata portion for the one or more images to indicate avoiding generating additional images using image interpolation of the one or more images in the optimal FRC operational mode.

4. The method of claim 1, wherein the one or more motion characteristics comprise one or more of: histograms of components of motion vectors, standard deviations of components of motion vectors, kurtoses of components of motion vectors, or skews of components of motion vectors.

5. The method of claim 1, further comprising:
   comparing at least one motion characteristic in the one or more motion characteristics of the one or more images with a variance threshold;
   based on results of comparing the at least one motion characteristic with the variance threshold, determining whether image content visually depicted in the one or more images comprises relatively random motions.

6. The method of claim 1, further comprising:
   determining one or more relationships between one or more peaks of a histogram of components of motion vectors represented in the one or more motion characteristics of the one or more images and one or more other portions of the histogram;
   based on the one or more relationships, determining whether image content visually depicted in the one or more images comprises relatively random motions.

7. The method of claim 1, wherein the one or more images comprise a plurality of spatial regions; wherein the plurality of spatial regions respectively corresponds to a plurality of sets of motion characteristics; wherein each spatial region in the plurality of spatial regions corresponds to a respective set of motion characteristics; wherein the optimal FRC operational mode represents a FRC operational mode optimally selected from a plurality of FRC operational modes for a specific spatial region in the plurality of spatial regions of the one or more images; and wherein the motion characteristics metadata portion is to be used to determine a second optimal FRC operational mode with the downstream device that represents a second different FRC operational mode optimally selected from the plurality of FRC operational modes for a second specific spatial region in the plurality of spatial regions of the one or more images.

8. The method of claim 1, wherein at least one of the one or more motion characteristics related to the one or more images is determined based on image content visually depicted in one or more images.

9. The method of claim 1, wherein at least one of the one or more motion characteristics related to the one or more images is determined based on motion vectors in one or more images, and wherein the motion vectors are already pre-computed by an upstream device.

10. One or more non-transitory computer-readable media storing a sequence of instructions, which when executed by one or more computing processors, cause the one or more computing processors to perform the method as recited in claim 1.

11. A method, comprising:
  decoding, from a video stream, one or more images and a motion characteristics metadata portion, wherein the motion characteristics metadata portion is generated by an upstream device for the one or more images based at least in part on one or more motion characteristics related to the one or more images, wherein the one or more motion characteristics are determined based on image content visually depicted in one or more images, wherein the motion characteristics metadata portion encoded in the video stream indicates whether the one or more motion characteristics are of a random motion type;
  using the motion characteristics metadata portion to determine an optimal frame rate conversion (FRC) operational mode for the one or more images;
  operating the optimal FRC operational mode to generate, based on the one or more images, one or more additional images in addition to the one or more images;
  causing the one or more images and the one or more additional images to be rendered on a display device.

12. The method of claim 11, wherein the optimal FRC operational mode represents a specific FRC operational mode selected from a plurality of FRC operational modes for the one or more images.

13. One or more non-transitory computer-readable media storing a sequence of instructions, which when executed by one or more computing processors, cause the one or more computing processors to perform the method as recited in claim 11.

14. An apparatus comprising one or more computing processors and one or more non-transitory computer-readable media storing a sequence of instructions, which when executed by the one or more computing processors, cause the one or more computing processors to perform the method as recited in claim 1.

15. An apparatus comprising one or more computing processors and one or more non-transitory computer-readable media storing a sequence of instructions, which when executed by the one or more computing processors, cause the one or more computing processors to perform the method as recited in claim 11.

* * * * *